(12) United States Patent
Nazir et al.

(10) Patent No.: US 11,798,090 B1
(45) Date of Patent: Oct. 24, 2023

(54) SYSTEMS AND METHODS FOR SEGMENTING CUSTOMER TARGETS AND PREDICTING CONVERSION

(71) Applicant: DataInfoCom USA, Inc., Austin, TX (US)

(72) Inventors: Mubbashir Nazir, Kolkata (IN); Atanu Maity, Kolkata (IN); Chun Wang, Austin, TX (US); Patrick John Thielke, Houston, TX (US); Wensu Wang, Katy, TX (US); Ligang Bai, Houston, TX (US)

(73) Assignee: Data Info Com USA, Inc., Austin, TX (US)

( * ) Notice: Subject to any disclaimer, the term of this patent is extended or adjusted under 35 U.S.C. 154(b) by 767 days.

(21) Appl. No.: 16/732,258

(22) Filed: Dec. 31, 2019

Related U.S. Application Data

(63) Continuation-in-part of application No. 16/146,590, filed on Sep. 28, 2018, now Pat. No. 10,866,962.

(60) Provisional application No. 62/564,468, filed on Sep. 28, 2017.

(51) Int. Cl.
| | |
|---|---|
| G06Q 40/08 | (2012.01) |
| G06V 10/75 | (2022.01) |
| G06N 20/00 | (2019.01) |
| G06N 20/20 | (2019.01) |
| G06N 3/084 | (2023.01) |
| G06F 18/211 | (2023.01) |
| G06F 18/213 | (2023.01) |
| G06N 5/01 | (2023.01) |

(52) U.S. Cl.
CPC .............. *G06Q 40/08* (2013.01); *G06F 18/211* (2023.01); *G06F 18/213* (2023.01); *G06N 3/084* (2013.01); *G06N 5/01* (2023.01); *G06N 20/00* (2019.01); *G06N 20/20* (2019.01); *G06V 10/7553* (2022.01)

(58) Field of Classification Search
CPC ..... G06Q 40/08; G06K 9/6228; G06K 9/6232; G06N 3/084; G06N 5/003; G06N 20/00; G06N 20/20; G06V 10/7553
See application file for complete search history.

(56) References Cited

U.S. PATENT DOCUMENTS

| | | | |
|---|---|---|---|
| 8,036,979 | B1 | 10/2011 | Torrez et al. |
| 8,489,450 | B2 | 7/2013 | Agarwal |

(Continued)

OTHER PUBLICATIONS

"A Basic Introduction to CHAID," retrieved from <https://smartdrill.com/pdf/A%20Basic%20Introduction%20to%20CHAID.pdf> Oct. 24, 2020.
"Building Classification Models: ID3 and C4.5," retrieved from <https://cis.temple.edu/~ingargio/cis587/readings/id3-c45.html> Oct. 24, 2020.

(Continued)

*Primary Examiner* — Bobbak Safaipour
(74) *Attorney, Agent, or Firm* — Chad Peterson

(57) ABSTRACT

Methods, systems and apparatuses, including computer programs encoded on computer storage media, are provided for generating prediction models related to targeting and acquiring customers. Thousands of variables of historical data, including data for prospects and external data, are used to train the prediction models. The variables are pre-processed, then sensitivity analysis is performed on the input variables with respect to the target. The variables with the most influence on the target are selected and added to the feature set used for training a prediction model.

20 Claims, 36 Drawing Sheets

(56) References Cited

U.S. PATENT DOCUMENTS

| | | | |
|---|---|---|---|
| 8,655,695 | B1 | 2/2014 | Qu et al. |
| 8,688,607 | B2 | 4/2014 | Pacha |
| 9,087,332 | B2 | 7/2015 | Bagherjeiran et al. |
| 10,152,681 | B2 | 12/2018 | Stephan et al. |
| 10,866,962 | B2* | 12/2020 | Wang et al. ............. G06F 7/14 |
| 2002/0072921 | A1* | 6/2002 | Boland et al. ........ G06Q 10/063 705/7.11 |
| 2002/0087544 | A1 | 7/2002 | Selkirk et al. |
| 2006/0222266 | A1 | 10/2006 | Lauze et al. |
| 2009/0073376 | A1 | 3/2009 | Swift |
| 2009/0287628 | A1 | 11/2009 | Indeck et al. |
| 2012/0253932 | A1 | 10/2012 | Kim et al. |
| 2014/0218165 | A1 | 8/2014 | Johnson et al. |
| 2015/0150017 | A1 | 5/2015 | Hu et al. |
| 2016/0358312 | A1 | 12/2016 | Kolb, V et al. |
| 2016/0379309 | A1 | 12/2016 | Shikhare |
| 2017/0103167 | A1 | 4/2017 | Shah |
| 2018/0322166 | A1 | 11/2018 | Geigel et al. |
| 2019/0102476 | A1 | 4/2019 | Liu et al. |
| 2022/0210682 | A1* | 6/2022 | Kulkarni et al. ...... H04W 24/10 |

OTHER PUBLICATIONS

Agrawal et al., "The Quest Data Mining System," KDD-96 Proceedings, pp. 244-249 (2009).

Ali, "Decision Tree with Practical Implementation," retrieved from <https://medium.com/machine-learning-researcher/decision-tree-algorithm-in-machine-learning-248fb7de819e> Oct. 24, 2020.

Baak et al., "A new correlation coefficient between categorical, ordinal and interval variables with Pearson characteristics," retrieved from <https://arxiv.org/pdf/1811.11440.pdf> Oct. 24, 2020.

Brownlee, "How to Develop Convolutional Neural Network Models for Time Series Forecasting," retrieved from <https://machinelearningmastery.com/how-to-develop-convolutional-neural-network-models-for-time-series-forecasting/> Oct. 24, 2020.

Carrasco, "Gaussian Mixture Models Explained," retrieved from <https://towardsdatascience.com/gaussian-mixture-models-explained-6986aaf5a95> Oct. 24, 2020.

Chen et al., "On the similarity metric and the distance metric," Theoretical Computer Science 410 (2009).

Chollet, "Building Autoencoders in Keras," retrieved from <https://blog.keras.io/building-autoencoders-in-keras.html> Oct. 24, 2020.

Fleshman, "Spectral Clustering," retrieved from <https://towardsdatascience.com/spectral-clustering-aba2640c0d5b> Oct. 24, 2020.

Goshtasby, Image Registration, "Similarity and Dissimilarity Measures," Springer-Verlag London 2012, pp. 7-66.

Himmetoglu, "Stacking Models for Improved Predictions," retrieved from <https://www.kdnuggets.com/2017/02/stacking-models-imropved-predictions.html> Oct. 24, 2020.

Kass, "An Exploratory Technique for Investigating Large Quantities of Categorical Data," Applied Statistics, Vol. 29, No. 2 (1980), pp. 119-127.

Khandelwal, "Deep Learning Autoencoders," retrieved from <https://medium.com/datadriveninvestor/deep-learning-autoencoders-db265359943e> Oct. 24, 2020.

Maklin, "Affinity Propagation Algorithm Explained," retrieved from <https://towardsdatascience.com/unsupervised-machine-learning-affinity-propagation-algorithm-explained-d1fef85f22c8> Oct. 24, 2020.

Ng, "Association Rules and the Apriori Algorithm: A Tutorial," retrieved from <https://www.kdnuggets.com/2016/04/association-rules-apriori-algorithm-tutorial.html> Oct. 24, 2020.

Patlolla, "Understanding the concept of Hierarchical clustering Technique," retrieved from <https://towardsdatascience.com/understanding-the-concept-of-hierarchical-clustering-technique-c6e8243758ec> Oct. 24, 2020.

Roman, "Unsupervised Machine Learning: Clustering Analysis," retrieved from <https://towardsdatascience.com/unsupervised-machine-learning-clustering-analysis-d40f2b34ae7e> Oct. 24, 2020.

Seo, "Bidirectional Attention Flow for Machine Comprehension," retrieved from <https://www.semanticscholar.org/paper/Bidirectional-Attention-Flow-for-Machine-Seo-Kembhavi/3a7b63b50c64f4ec3358477790e84cbd6be2a0b4> Oct. 24, 2020.

Taylor, "Forecasting at Scale," retrieved from <https://peerj.com/preprints/3190/#> Oct. 24, 2020.

* cited by examiner

| Internal | External |
|---|---|
| None | - Total Population<br>    By Age<br>    By Gender<br>    By Marital Status<br>    By Veteran Status<br><br>- Population Density<br>- Populaton Change<br>- Educational Attainment<br><br>- Employment Status<br>    Total Workers In Labor Force<br>      Civilian Labor Force - Employed<br>      Civilian Labor Force - Unemployed<br>      Armed Forces<br>    Population Not in Labor Force<br><br>- Occupation<br>    Management, Business, Science, and Arts<br>    Service<br>    Sales / Office<br>    Natural Resources, Construction, and Maintenance<br>    Production, Transportation, Materials Handling<br>- Worker Class<br>    Civilian<br>      Private<br>      Government<br>      Self Employed<br>    Unpaid Family workers<br>    Military<br><br>- Local Industry Representation<br>- Number of vehicles per household<br>- Means of Transportation to Work<br><br>- Median Household Income<br>- Food Stamp Utilization<br>- Percentage of households at or below the Poverty Level |

Figure 6A: External Geo-Demographic Data Categories with Representative Attributes

| Internal | External | |
|---|---|---|
| | Consumer Price Index | • CPI - Medical Care<br>    Cost of Prescription and OTC drugs<br>    Fees related to professional services provided physicians, dentists, and opticians<br>    Hospital, Nursing Home, and Specialized care service costs<br>    Insurance costs, including commercial medial insurance, BCBS, and HMO premiums<br><br>• CPI - Transportation<br>    Cost of motor vehicle maintenance and repairs<br>    Cost of motor vehicle insurance premiums |
| | Retail Gasoline Prices | • Per-gallon fuel costs |
| | Residential Real Estate Market Health | • Single Family Home Values<br>    Single Family Home Values - Absolute<br>    Single Family Home Values - Normalized $/sqft<br>    Single Family Home Rental Prices - Absolute<br>    Single Family Home Rental Prices - Normalized $/sqft<br><br>• Condominimum/Apartment Values<br>    Condominum Values - Absolute<br>    Condominum Values - Normalized/sqft<br>    Apartment Values - Absolute<br>    Apartment Values - Normalized/sqft<br><br>• Residential Rental Rates<br>    Monthly Apartment Rental Rates - Absolute<br>    Monthly Apartment Rental - Normalized $/sqft<br>    Monthly Home Rental Rates - Absolute<br>    Monthly Home Rental Rates - $ per square foot<br><br>• Residential Real Estate Market Data<br>    Homes sold for loss (%)<br>    Homes sold for gain (%)<br>    Foreclosures<br>    Price-to-Rent Ratio<br>    Price to Income ratio<br>    For Sale Inventory<br>    Inventory Age<br><br>• Economic Indicators<br>    Conventional Mortgage Rates<br>    Jumbo Mortgage Rates<br>    New Residential Construction<br>    Foreclosures<br><br>• Housing Density<br>    Availability<br>    Occupancy<br>    Vacancies<br>  Owner Occupied Housing Units<br>  Renter Occupied Housing Units |
| | Commercial Real Estate Market Health | • Commercial Real Estate Availability by Property Type and Class<br>    Supply/Demand for Commercial Space<br>    Supply/Demand for Industrial Space<br>    Supply/Demand for Retail Space<br><br>• Lease Rates by property class<br>• Occupancy Rates<br>• Commercial Construction |

Figure 6B: External Geo-Economic Data Categories with Representative Attributes

| Internal | External | |
|---|---|---|
| None | Local Traffic | • Traffic Density<br>• Vehicle Registrations by vehicle type<br><br>• New Vehicle Sales<br>   by vehicle type<br>   by vehicle make<br>   by vehicle model<br>   by vehicle year<br>   by vehicle size<br><br>• Licensed Drivers<br>   by gender<br>   by age<br><br>• Daily Traffic Patterns<br>   Commuters<br>   Public Transportation<br>• Commuting Times<br>• Commuting Distances<br><br>• Location of Traffic Generators<br>   Shopping Centers<br>   Transportaton Hubs<br>   Hospitals/medical centers<br>   Entertaiment districts<br><br>• Construction Zones<br><br>• Roadway classifications<br>• Roadway elevation changes<br>• Speed Limits |
| | Local Traffic Incidents and Accidents | • Traffic Incident Data<br>   Location<br>   Date<br>   Time<br>   Cause<br><br>• Accident Outcomes<br>• Accident Fatalities |

Figure 6C: External Local Traffic Data Categories with Representative Attributes

| Internal | External | |
|---|---|---|
| None | Land-Based Observations | • Local Observations and Measurements<br>    Hourly (or better) Temperature<br>    Daily Min/Max Temperatures<br>    Hourly (or better) precipitation<br>    Daily Precipitation Totals<br>    Sun Rise<br>    Sun Set<br>    Average Wind Speed<br>    Prevailinig Wind Directiokn<br>    Peak Sustained Wind Speed<br>    Max Wind Gust Speed<br>    Cloud Cover<br>    Visibility<br>    Climate Normals |
| | Satellite Imagery | • Local Imagery and Interpretations<br>    Hourly (or better) cloud cover data<br>    Pollution Monitoring<br>    Humidity<br>    Air Quality<br>       Surface Smoke<br>       Surface Dust<br>       Ozone |
| | Radar Returns | • Local Imagery and Interpretations<br>    Wind Speed<br>    Wind Direction<br>    Precipitation Totals<br>    Precipitation Rate |

Figure 6D: External Local Weather Data Categories with Representative Attributes

| Internal | External | |
|---|---|---|
| | Damaging Wind | • Historical Damaging Wind Watch Declarations<br>• Historical Damaging Wind Warning Declarations<br>• Historical Occurrances<br>    Location<br>    Date<br>    Local Intensity<br>    Property Damage / Loss Amount |
| | Hail | • Historical Hail Watch Declarations<br>• Historical Hail Warning Declarations<br>• Historical Occurrances<br>    Location<br>    Date<br>    Local Intensity<br>    Property Damage / Loss Amount |
| | Thunderstorms | • Historical Thunderstorm Watch Declarations<br>• Historical Thunderstorm Warning Declarations<br>• Historical Occurrances<br>    Location<br>    Date<br>    Local Intensity<br>    Property Damage / Loss Amount |
| | Lightning Strikes | • Cloud to Ground Lightning Strike Frequency<br>• Lightning Damage<br>• Lightning Casualties |
| | Winter Weather | • Historical Winter Weather Watch Declarations<br>• Historical Winter Weather Warning Declarations<br>• Historical Occurrances<br>    Location<br>    Date<br>    Local Intensity<br>    Property Damage / Loss Amount |
| | Other Severe Weather Warnings | • Excessive Heat Warnings<br>• Heat Advisory<br>• Gale<br>• Flash Flood<br>• Red Flag Fire Warnings<br>• Storm Surge<br>• Hazardous Seas<br>• Small Craft Advisory<br>• Coastal Flood Advisory |

Figure 6E: External Localized Severe Weather Categories with Representative Attributes

| Internal | External | |
|---|---|---|
| | Catastrophes and Natural Hazard Events | • Loss Experience<br>    Property Damage<br>    Crop Damange<br>    Injuries<br>    Fatalities |
| | Catastrophes and Natural Hazard Events | • Location<br>• Date<br>• Presidental Disaster Declaration<br>• Global Disaster Identifier<br>• Named Event |
| | Location-Specific Natural Hazard Peril Assessment | • Distance of insured property from:<br>    Flood zones<br>    Hail zones<br>    Tornado zones<br>    Earthquake zones / faults<br>    Brush Fire zones<br>    Landslide zones<br>    Wind Damage<br>    Sinkhole locations<br>    Coastal areas / bodies of water<br>• Distance to nearest fire station<br>• Distance to nearest police station |
| | Earthquake Peril | • Lava Flow Hazard Zones<br>• Tsunami Evacuation Zones<br>• Fault Maps<br>• Earthquake History<br>    Magnitude<br>    Frequency<br>    Property Damage / Loss Amount<br>• Seismic Activity |
| | Wildfire Peril | • Historical Occurrances<br>    Location<br>    Date<br>    Local Intensity<br>    Property Damage / Loss Amount<br>• Presence/amount of available fuel<br>• Slope<br>• Accessibility |
| | Sinkhole Peril | • Sinkhole Locations<br>• Property Damage / Loss Amount |
| | Hurricane / Tropical Storm Peril | • Historical Occurrances<br>    Location<br>    Date<br>    Local Intensity<br>    Property Damage / Loss Amount |
| | Flood Peril | • Flood Zones<br>• Historical Occurrances<br>    Location<br>    Date<br>    Local Intensity<br>    Property Damage / Loss Amount |
| | Tornado / Damaging Wind Peril | • Historical Tornado Watch Declarations<br>• Historical Tornado Warning Declarations<br>• Historical Occurrances<br>    Location<br>    Date<br>    Local Intensity<br>    Property Damage / Loss Amount |

Figure 6F: External Local Catastrophe Data Categories with Representative Attributes

| Internal | External | |
|---|---|---|
| | Public Safety | • Local Fire Protection Capabilities<br>    Emergency Communication Infrastructure<br>    Water Availability and Locations<br>    Department Size<br>    Firestation Location<br>    Fire Station Service Type<br><br>• Local Crime<br>   Violent Crime<br>   Burglary<br>   Larceny<br>   Motor Vehicle Theft |
| | Public Health | • Drug Use<br>• Mortality Data<br>• Behavioral Risk factor Data<br>• CDC Vital Statistics<br>• Opoiod Use / Abuse |

Figure 6G: External Public Health and Safety Data Categories with Representative Attributes

| Internal | Exernal | |
|---|---|---|
| | State and Local Legal and Regulatory Environment | • Motorcycle Helmet Law adoption and enforcement<br>• Recreational Marijuana adoption<br>• Distracted Driving Law adoption and enforcement<br>• Building Code Data<br>    Local Building Codes<br>    Local Building Code Adoption<br>    Local Building Code Enforcement Practices<br>• Alcohol-related incident data<br>• DUI data<br>• Speed camera locations<br>• Speed enforcement<br><br>• Attorneys per Capita<br>    Personal Injury attorneys<br>    Other Attorneys |

Figure 6H: External Legal and Regulatory Data Categories with Representative Attributes

| Internal | Exernal | |
|---|---|---|
| | Industry Benchmarking | Best's Aggregates and Averages<br>Best's Insurance Reports<br>Best's State Rate Filing<br>Best's Financial Suite |
| | Conning & Company | Insurance Segment Reports<br>Forecast & Analysis<br>Insurance Trends Report |
| | Council of Insurance Agents & Brokers (CIAB) | CIAB rate change reports |
| | SNL Financial | Rate Filings |
| | ISO | ISO Trends<br>ISO Fast Track data<br>ISO Underwriting Results AY, PY |
| | Perr & Knight | Rate Filings |

Figure 6I: External Industry Benchmarking Data Categories with Representative Data Attributes

| Internal | External |
|---|---|
| | • Traditional Media Consumption<br>   Platforms<br>   Usage<br>   Daily Household Screentime<br><br>• Social Media Engagement<br>   Accounts<br>   Household profiles<br>   Usage<br><br>• Social Media Monitoring<br><br>• Mobile Phone Usage<br><br>• Life Events<br>   New/Expecting Parents<br>   Marriage/Divorce<br>   New Graduates<br>   New Job/Retiree |

Figure 6J: External Social and Behavioral Data Categories with Representative Attributes

| Internal | | External |
|---|---|---|
| Personal Attributes | • Name<br>• Social Security Number<br>• Gender<br>• Age<br>• Address<br>• Marital Status<br>• Contact Information and Preferences | |
| Residence | • Residence Type<br>• Own or Rent<br>• Mortgage Holder<br>• Time at current residence<br>• Address History | |
| Occupation | • Occupation<br>• Employment Tenure<br>• Employment History<br>• Education | |
| Household | • Spouse / Partner<br>   Name<br>   Social Security Number<br>   Gender<br>   Age<br>   Address<br><br>   Occupation<br>   Employment Tenure<br>   Employment History<br>   Education<br><br>• Number, Ages, and Gender of children<br>• Number of Drivers in Household<br><br>• Household Reported Licensed Driver Data<br>   Drivers' License numbers<br>   License type<br>   License restrictions<br>   Known Impairments<br>   Issuing State<br>   Expiration Date<br>   Years as a licensed driver<br><br>   Driver Training/Improvement Classes - attendance and dates | • Identification of Undisclosed Household Drivers |

Figure 6K: Internal and External Policyholder Personal Data Categories with Representative Attributes

| Internal | | External | |
|---|---|---|---|
| Financial Position | • Total Reported Household Income | Consumer Financial Data | • Household Income Verificaion |
| | • Policy Billing History | | • 3-Bureau Credit scores |
| | | | • 3-Bureau Credit Reports |
| | | | • Emloyment Verificaion |
| | | | • Earnings History |
| | | | • Bankruptcy |
| | | | • Financial Account Data |
| | | |     Investment Accounts / Balances |
| | | |     Savings Accounts / Balances |
| | | |     Cash / Cash Equivalents |
| | | |     Revolving credit accounts |
| | | |     Revolving credit payment history |
| | | | • Outstanding consumer debt balances and repayment schedules |
| | | |     Mortgage(s |
| | | |     Auto Loans |
| | | |     Student Loans |
| | | |     Home equity loans |
| | | |     Other consumer credit lines |
| | | | • Transaction History and Trends |
| | | |     Purchase History and Locations |
| | | |     Loyalty Card Transactions |
| | | |     Spending Changes |
| | | |     Coupon usage |

Figure 6L: Internal and External Policyholder and Household Financial Position Data Categories with Representative Attributes

| Internal | External |
|---|---|
| • Vehicle Identification Number (VIN)<br>• Vehicle Manufacturer<br>• Vehicle Model<br>• Year<br>• Vehicle Type<br>   Private Passenger Auto<br>   Commercial Vehicle<br>   Motorhome/Recreational Vehicle<br>   Watercraft<br>   Other<br><br>• Vehicle Body Type<br><br>• Vehicle Dimensions<br>   Gross Vehicle Weight<br>   Number of Doors<br>   Bumper Height<br><br>• Vehicle Performance<br>   Number of cylinders/displacement<br>   Horsepower<br>   Acceleration times<br>   Braking times<br><br>• Vehicle Safety Features<br>   Driver and Passenger Restraint Systems<br>   Number of Airbags<br>   Driver Assist Systems<br>      Lane Keeping Assistance/Warning<br>      Blindspot Warning<br>      Collision Warning<br>      Collision Avoidance<br>      Adaptive Cruise Control<br>   Antilock Brakes<br>   Daytime Running Lights<br><br>• Anti-Theft System<br>• Onboard Diagnostic Device<br><br>• Cost New<br>• Aftermarket Additions / Modifications<br><br>• Ownership<br>   Owned<br>   Leased<br>     Lease Term<br>     Term Expiration<br>     Monthly Payments<br>   Financed<br>     Monthly Payments<br>     Payments Remaining<br><br>• Intended Vehicle Use<br><br>• Estimated Annual Miles Driven<br>• Daily commuting miles<br><br>• Vehicle Daytime Location<br>• Vehicle Overnight Location<br><br>• Vehicle Usage Data<br>   Trip-level data - loctions, times, dates, distances traveled<br>   Hard braking events<br>   Average and max speeds | • Vehicle History Reports - inspection, collision, repair, etc<br>   Inspection Dates and Outcomes<br>   Collisions<br>   Repairs<br>   Maintenance History<br><br>• Mileage history<br><br>• Vehicle Safety Ratings<br><br>• Vehicle Crash Test Ratinga<br><br>• Theft rates<br><br>• Industry-Wide Claim Frequency and Severity<br>   by vehicle type<br>   by vehicle make<br>   by vehicle model<br>   by vehicle year<br>   by coverage<br>   by zip code (or better)<br>   by zise of loss<br>   by amount of insurance<br>   by cause of loss |

Figure 6M: Internal and External Insured Assets – Vehicles Data Categories with Representative Attributes

| Internal | External |
|---|---|
| • Dwelling Attributes<br>    Construction Year<br>    Structure Type<br>        Total Living Area (square feet)<br>        Number of stories<br>        Room count<br>        Chimney count<br>        Bathroom count<br>        Bedroom count<br>    Construction Type<br>    Foundation type<br>    Constructuon Quality Rating<br>        Building Material - Foudation, frame, exterior walls, roof<br>        Roof Type<br>    Water Source<br>    Electric Power Source<br><br>• HVAC<br>    Central Heating / Air?<br>    Number of Air Conditioning Units<br>    Primary Heating System Type<br>    Secondary Heating System Type<br><br>• Time since updates to:<br>    Plumbing<br>    Electrical<br>    Primary Heating System<br>    Secondary Heating System<br>    Windows<br>    Roof<br>    Septic System<br><br>• Home Safety Features<br>    Fire Alarm - type and description<br>    Sprinkler system installed?<br>    Smoke Detectors - type, number, and description<br>    Fire Extinguishers - type and number<br>    Burglar Alarm - type and description<br><br>• Gate/Controlled Access?<br><br>• Presence on Premise of:<br>    Pool<br>    Animals<br>        Number<br>        Type<br>        Breed<br>        Size<br>        Bite History<br>    Trampoline/stakeboard ramp<br>    Other External Structures<br><br>• Residence Type<br>    Primary<br>    Secondary<br>    Seasonal<br>• Days Occupied<br>• Owner occupied?<br>• Number of families in residence<br>• Occupant Count<br><br>• Size of property in acres<br>• Elevation above sea level<br>• Slope<br>• Assessed Tax Value<br>• Replacement Cost<br><br>• Location Assessment<br>    Distance to nearest fire station<br>    Distance to nearest police station<br>    Total number of policyholders insured within a 1/3/5/10 mile radius<br>    Total dollar value of assets insured within a 1/3/5/10 mile radius<br>    Total number of policyholders in Zip code<br>    Total number of policyholders in MSA<br>    Total number of policyholders in County<br>    Total dollar value of assets insured in Zip code<br>    Total dollar value of assets insured in MSA<br>    Total dollar value of assets insured in County | • Location-Specific Natural Hazard Peril Assessment<br>    Distance of insured property from:<br>        Flood zones<br>        Hail zones<br>        Tornado zones<br>        Earthquake zones / faults<br>        Brush Fire zones<br>        Landslide zones<br>        Wind Damage<br>        Sinkhole locations<br>        Coastal areas / bodies of water |

Figure 6N: Internal and External Insured Assets – Home Data Categories with Representative Attributes

| Internal | | External |
|---|---|---|
| General | • Customer Tenure<br>• Products Owned<br>• Customer Lifetime Value | |
| Policy | • Policy Type<br>    Auto<br>    Home<br>    Landlord<br>    Renter<br>    Other<br><br>• Policy Term<br>• Policy Effective Date<br>• Times Renewed<br>• Continuous Coverage?<br>• Prior lapse on record?<br>• Length of Lapse<br>• Deductible<br>• State Minimum Coverage Amount? | |
| Policy Coverages | Personal Lines<br><br>• Auto / Vehicle Coverages and Coverage Amounts<br>    Collision<br>    Comprehensive<br>    Underinsured Motorist<br>    Uninsured Motorist<br>    Medical Payments<br>    Liability<br>    Personal Injury Protection<br>    Other<br><br>• Homeowners Coverages and Coverage Amounts<br>    Homeowner - Property<br>    Homeowner - Liability<br>    Landlord - Property<br>    Landlord - Liability<br>    Renter<br><br>• Commercial Auto Coverages and Coverage Amounts<br>• Commercial Property Coverages and Coverage Amounts<br>• Other<br><br>• Optional Coverages<br>    Home Contents<br>    Vehicle Contents<br>    Home Electronics<br>    Jewelry<br>    Tools<br>    Art<br>    Musical Instruments<br>    Other | |
| Customer Acquisition | • Channel<br>    Direct<br>    Independent Agent<br>    Captive Agent<br>    Group<br><br>• Producer<br>    Agent / Agency Name<br>    Location / Region<br>    Hierarchy<br>    Commission Structure | |
| Customer Relationship | • Customer - Carrier Interactions<br>    Contact Center - inbound and outbound<br>    CRM<br>    Call Center Representative written notes and comments<br>    Call Recordings<br>    Chat logs<br><br>    Outbound Marketing / Communications | |

Figure 6O: Internal Policyholder-Carrier Interaction Data Categories with Representative Attributes

| Internal | External |
|---|---|

- Claim Count - Primary Insured and Household
    Type
    Date
    Disposition

- Claim History and Disposition - Primary Insured and Household
    Claim Type
    Loss Date and time
    Loss Location
    Loss Description
    Weather at time of incident
    Claim Creation Date
    Attorney Representation?
    Claim Disposition
    Incurred Loss Amount
    Liability Percent
    Salvage and Subrogation
    Police Report Filed?

- Prior Carrier History
    Prior Carrier Name
    Prior Carrier AM Best Code
    Prior Carrier NAIC Code
    Customer Tenure with Prior Carrier
    Prior Claims Filed?
        Type
        Date
        Disposition Figure 6P: Internal Claim History Data Categories with Representative Categories

| Internal | External |
|---|---|
| • Traffic Incident History - Primary Insured and Licensed Household Members<br>    Major violations<br>    Minor violations<br>    At-fault accidents<br>    Not-at-Fault accidents<br>    DUI<br>    Towing<br>    Glass<br>    License Suspension<br>    Theft/Vandalism<br>    Bodily Injury<br>    Other<br><br>• Home or Homeowner<br>    Liability Claims against homeowner<br>    History of Losses due to natural causes<br>    Theft Loss<br>    Fire Loss<br>    Other<br><br>• Other Policy/Coverage Types<br><br>• Incident Date<br>• Incident Disposition | |

Figure 6Q: Internal Driving History Data Categories with Representative Attributes

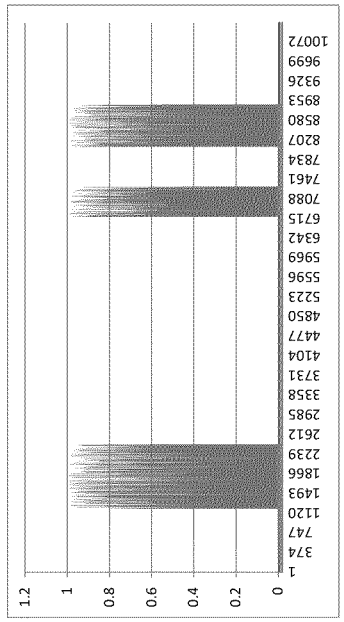
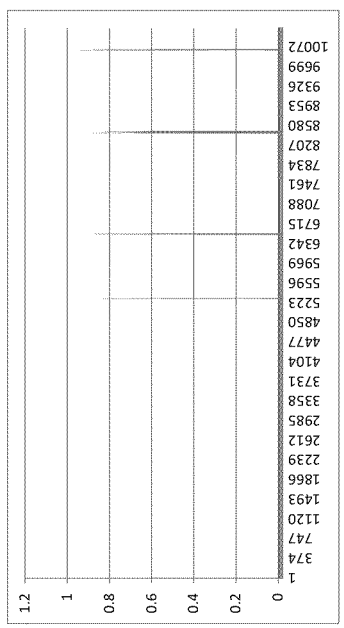
FIG. 13

SYSTEMS AND METHODS FOR SEGMENTING CUSTOMER TARGETS AND PREDICTING CONVERSION

CROSS-REFERENCE TO RELATED APPLICATIONS

The present application claims priority to U.S. Pat. Application No. 16/146,590, titled "DATABASE MANAGEMENT SYSTEM FOR MERGING DATA INTO A DATABASE," filed Sep. 28, 2018, and claims the benefit of U.S. Provisional Pat. Application No. 62/564,468, filed Sep. 28, 2017, which are hereby incorporated by reference herein in their entirety.

BACKGROUND

The present application generally relates to machine learning technologies as applied to acquisition of customers. More specifically, the present application relates to the creation of models that can be used to predict various aspects of a conversion process, e.g., likelihood of conversion, number of iterations before conversion, time required for conversion, cost of conversion, etc. Additionally, the present application relates to generating a feature set suitable for use in training a machine learning algorithm from a set of thousands (or more) of variables.

Businesses of all types struggle with targeting and acquiring customers. Marketing dollars are best spent on those prospects likely to convert, and further optimized on prospects who will be good customers once converted. The factors that drive conversion, and determine the desirability of a customer, are driven by a combination of an individual's personal characteristics, environment, relationships, and assets, among a host of other factors. Integrating these variables, and finding only those relevant to each particular customer, in each particular business, for each particular product, is often very difficult. Combining hundreds of sources of data on an individual, and automatically choosing which are relevant, can help better target prospects who are likely to convert.

There remains a need for a method for combining all available sources of data on conversion prospects and automatically determining which prospects are most likely to convert.

SUMMARY

In accordance with the foregoing objectives and others, exemplary methods and systems are disclosed herein to determine the most relevant variables relating to conversion among a set of hundreds or thousands of variables. Methods and systems are also disclosed to identify segments of prospects that are more likely to convert than others, predict the likelihood of conversion for a prospect, and predict other aspects of the conversion process, e.g., contact iterations before conversion, cost of conversion, time before conversion, etc.

In one embodiment, the invention relates to a method for creating a set of look-a-like prospects, the method comprising: receiving historical data regarding prospects, wherein the historical data comprises one or more input variables and a target, wherein the target comprises a conversion status of each prospect; selecting features from the historical data to create a feature set, wherein the feature selection comprises: performing correlation shape analysis on each input variable with respect to the target to generate a set of highly correlated input variables; training at least one machine learning model based on the feature set; identifying segments in a predefined range of conversion percentage based on the trained at least one machine learning model; determining a most suitable model from the at least one machine learning model; and generating a set of look-a-like prospects based on the determined model.

A second embodiment relates to a method for creating a conversion prediction model for predicting an aspect of conversion of a prospect, the method comprising: receiving historical data regarding prospects, wherein the historical data comprises one or more input variables and a target; feature engineering the historical data to create a feature set, wherein the feature engineering comprises: determine the relative importance of the input variables with respect to the target; selecting the variables of most importance and adding them to the feature set; and performing dimension reduction on the non-selected variables to create extracted features and adding the extracted features to the feature set; and creating the conversion prediction model based on the feature set.

A third embodiment relates to a method for creating a conversion prediction model for predicting an aspect of conversion for a set of look-a-like prospects, the method comprising: receiving historical data regarding prospects, wherein the historical data comprises one or more input variables and a first target, wherein the first target comprises a conversion status of each prospect; selecting features from the historical data to create a first feature set, wherein the feature selection comprises: performing correlation shape analysis on each input variable with respect to the target to generate a set of highly correlated input variables; training at least one machine learning model based on the first feature set; identifying segments in a range of conversion percentage based on the trained at least one machine learning model; determining a most suitable model from the at least one machine learning model; generating a look-a-like segment based on the determined model; feature engineering the historical data for the look-a-like segment to create a second feature set, wherein the feature engineering comprises: determining the relative importance of the input variables in the historical data for the look-a-like segment with respect a second target; selecting the variables of most importance and adding them to the second feature set; and performing dimension reduction on the non-selected variables to create extracted features and adding the extracted features to the second feature set; and creating the conversion prediction model based on the second feature set.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6Q illustrate types of data that may be used by the system as input variables.

FIG. 13 illustrates variables with low data percentages.

DETAILED DESCRIPTION

Embodiments of the present disclosure are best understood by referring to FIGS. 1-19 of the drawings, like numerals being used for like and corresponding parts of the various drawings.

In some examples, the methods and systems discussed herein may improve the efficiency and effectiveness in targeting, acquiring, pricing, and servicing customers in the insurance field. In some examples, the methods and systems discussed herein may provide for better risk assessment at the aggregate and individual level for businesses of all types, but most especially those with risk-sensitive pricing.

As used herein, "historical data" refers to a data set used to train or otherwise create a model, and generally includes multiple training instances, each instance comprising one or more feature inputs and a target output. The target output of a training set may also be referred to herein as a "label." "Current data" or "current input data" refers to data input into the trained model to generate a prediction, forecast, or other output.

Figure 1:
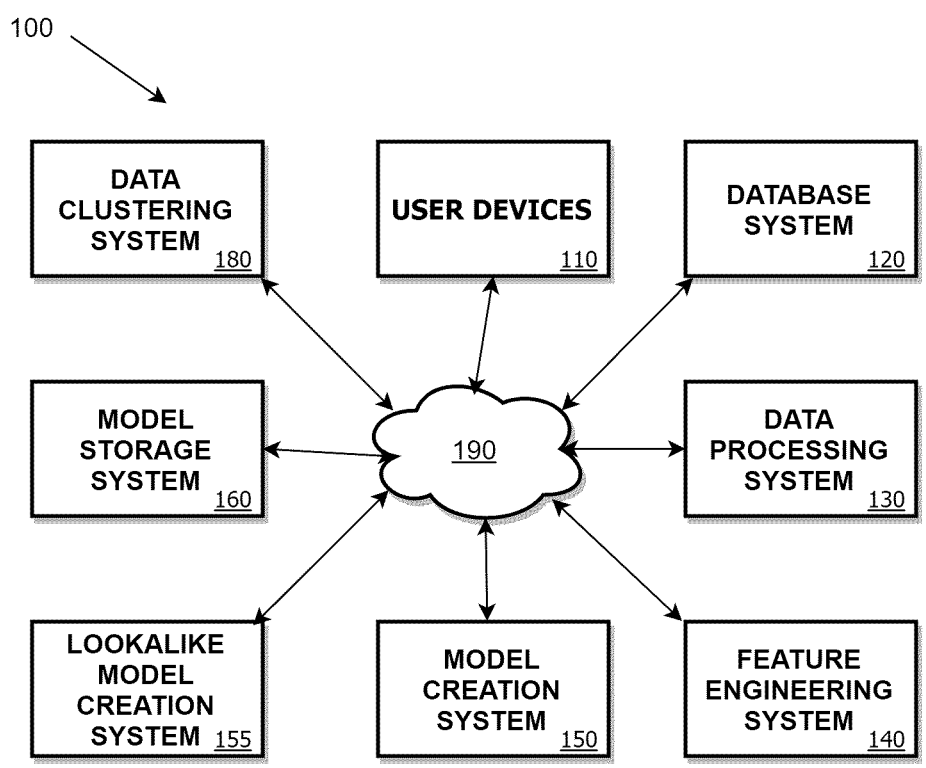
FIG. 1 is a schematic illustration of one example of a prediction system.

Referring to FIG. 1, a block diagram of an exemplary prediction system 100 is illustrated. The prediction system may include user devices 110, a database system 120, a data processing system 130, a feature engineering system 140, a conversion aspect model training/creation system 150, a look-a-like model creation system 155, a model storage system 160, and a data clustering system 180. The user devices, database system, and each other component may be remote from each other and interact through a communication network 190. Non-limiting examples of communication networks include local area networks (LANs), wide area networks (WANs) (e.g., the Internet), etc.

In certain embodiments, a user may access any of the other systems via a user device 110 connected to the network 190. A user device 110 may be any computer device capable of accessing any of the other systems, such as by running a client application or other software, like a web browser or web-browser-like application.

The database system 120 is adapted to receive, determine, record, transmit, and/or merge information for any number of policyholders, customers, claims, inquiries, potential contacts, and/or individuals.

The data processing system 130 is adapted to segment, process, clean, and/or aggregate data retrieved from the database system 120 to generate a data set for use in training the various prediction models described herein.

The feature engineering system 140 is adapted to reduce the number of variables in the data set. In one embodiment, the feature engineering system accomplishes this by determining the variables in the data set that have the most influence on determining the target. The feature engineering system may determine this by training preliminary models and evaluating the importance of each variable from testing and/or evaluating the preliminary models. After the most important variables have been determined, the feature engineering system may apply feature reduction techniques, e.g., autoencoders, etc., to the remaining variables.

The model creation system 150 is adapted to train or otherwise create (for types of models that do not require training (e.g., kNN)) prediction models. The model creation system may be adapted to create any type of model, including but not limited to, classification models, regression models, Markov chains, time series models, state space models, Bayesian models, boosted decision trees, neural networks, convolutional neural networks, recurrent neural networks, LSTM neural networks, or any other appropriate model, or combinations or ensembles thereof. To train a model, the model creation system will generally use a set of historical data, including input variables and a target. Multiple models with different hyperparameters may be created and evaluated to select a preferred model. In one embodiment, a hyperparameter autotuning system may be used to create, test, and select preferred models.

The look-a-like model creation system 155 is adapted to train or otherwise create models for identifying look-a-like prospects (e.g., prospects that are considered more likely to convert because they are similar to prospects that have converted in the past) and/or look-a-like segments (e.g., segments of prospects that are more likely to convert). The look-a-like model creation system may be adapted to create any type of model, including but not limited to, classification models, regression models, Markov chains, time series models, state space models, Bayesian models, decision trees, association rule mining models, boosted decision trees, neural networks, convolutional neural networks, recurrent neural networks, LSTM neural networks, or any other appropriate model, or combinations or ensembles thereof. To train a model, the model creation system will generally use a set of historical data, including input variables and a target. Multiple models with different hyperparameters may be created and evaluated to select a preferred model. In one embodiment, a hyperparameter autotuning system may be used to create, test, and select preferred models.

The model storage system 160 is adapted to store the models created by the model creation system 150. Any type of suitable storage system may be used, e.g., a database, file system, etc. If a database is user, the database may be any type of database. For example, the database may be a relational database (e.g., Oracle database, MySQL, Microsoft SQL Server, PostgreSQL, DB2, etc.), or a non-relational database /NoSQL database (e.g., Redis, Amazon DynamoDB, etc.). In one embodiment, the database may be a distributed database.

The data clustering system 180 is adapted to perform cluster analysis on the input variables of the historical dataset to determine how the data is clustered. After the historical dataset has been clustered, separate models may be trained for each cluster according to the methods disclosed herein.

Figure 2:
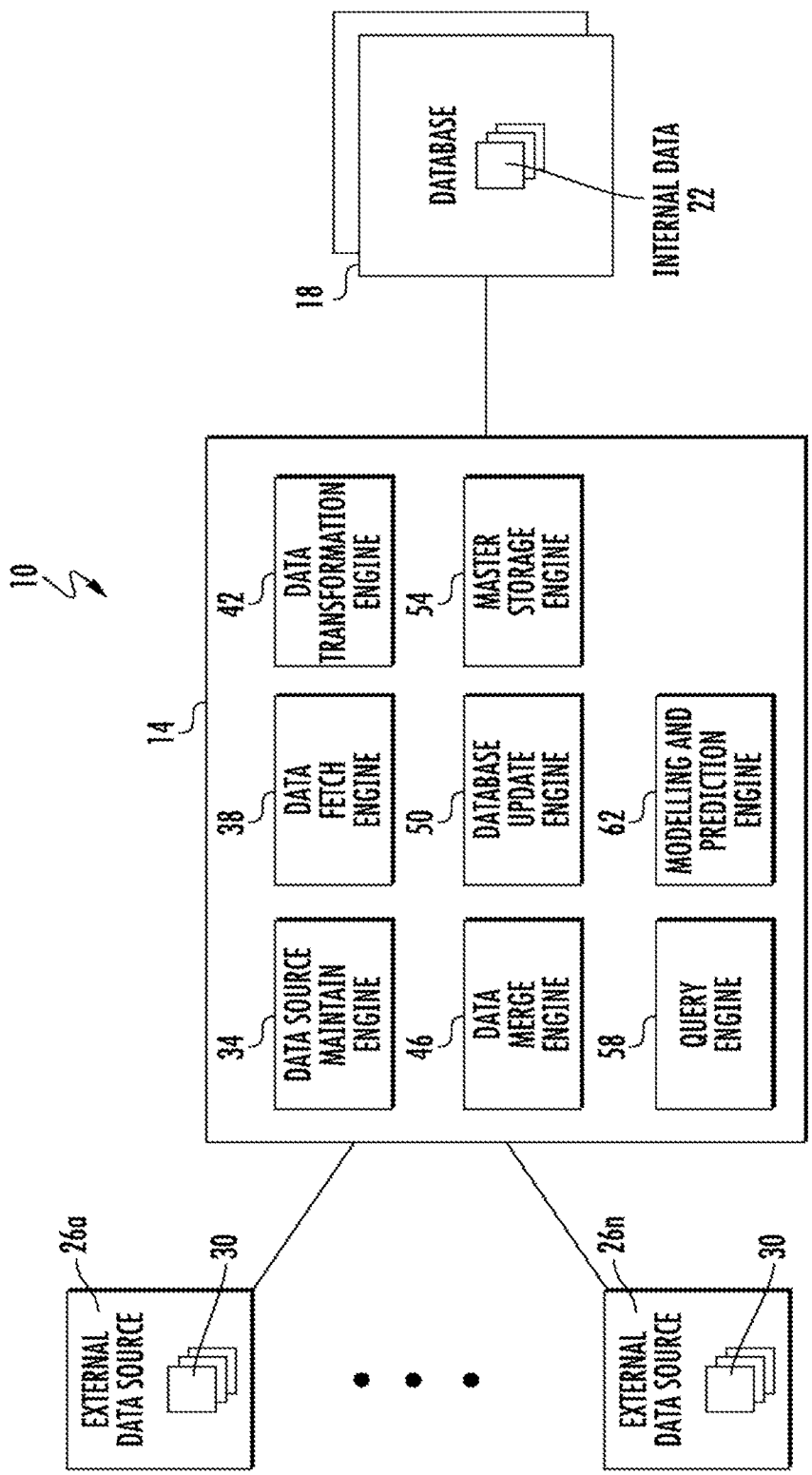
FIG. 2 is a schematic illustration of one example of a database system.

FIG. 2 is a schematic illustration of one example of a database system 120. As is illustrated, the database system 120 may include a database management system 14, one or more databases 18 storing internal data 22, and one or more external data sources 26 storing external data 30. According to one example, the database management system 14 may retrieve external data 30 from the external data source(s) 26, transform the external data 30 into a format compatible with the database 18 and/or the internal data 22, and then merge the external data 30 into the database 18 with the internal data 22, as described in U.S. Pat. Application 16/146,590, which is hereby incorporated by reference in its entirety.

As is illustrated in FIG. 2, the database system 120 includes the database management system 14, which may interact with external data sources 26 and database 18 in order to add data to the database 18, and also to search for data within the database 18. The database management system 14 may be software, hardware, or a combination of the preceding. Database management system 14 may include a data source maintain engine 34, a data fetch engine 38, a data transformation engine 42, a data merge engine 46, a database update engine 50, a master storage engine 54, a query engine 58, and a modelling and prediction engine 62. Furthermore, the database management system 14 may include further engines and components, some of which are discussed further herein.

The data source maintain engine 34 may store the location of the external data sources 26, may store the location of the external data 30 (e.g., FTP, URL, etc.), may store the history of an external data source 26 (and any changes), may store (and update) a constantly-updated repository of the availability of new or updated external data 30, may store a verification of each external data source 26's file path within the system 10, or any combination of the preceding.

The data fetch engine 38 may retrieve the most recent (i.e., most up-to-date) set of the external data 30 from the external data source 26, may ensure that the external data 30 retrieved from a particular external data source 26 is the most up-to-date version of the data, or any combination of the preceding.

The data transformation engine 42 may transform external data 30 to be compatible with the database(s) 18 and/or the internal data 22 stored in the database(s) 18. Examples of this transformation are discussed in detail below. This transformation may ensure that the fetched external data 30 may be merged (e.g., combined, joined, aggregated, etc.) into the database(s) 18, merged with the internal data 22 in the databases 18, and/or merged with other fetched external data 30.

The data merge engine 46 may merge the external data 30 into the database(s) 18 with the internal data 22 to create a "master" database dataset. This merge may be performed based on set of rules (both specified and auto-generated). Also, it may join all internal and external data 22, 30 into a master database dataset on the most granular level available, both spatially and temporally, in some examples. Examples of this merging of external data 30 are discussed in detail in U.S. Pat. Application 16/146,590.

The database update engine 50 may merge all of the different versions of the master database datasets together to keep the database(s) 18 updated. This merging of the different versions may occur continuously, periodically (e.g., every minute, every hour, every day), on demand (e.g., when instructed by a user of database management system 14), or any combination of the preceding. The master storage engine 54 may store, maintain, encrypt, back-up, rollover the database 18 (e.g., the master database dataset in the database 18), or any combination of the preceding.

The query engine 58 may query the database(s) 18 for data. This may allow data to be retrieved from the database(s) 18 for use by the user (e.g., for viewing by a user, to use for making predictions via the modelling and prediction engine 62). The modelling and prediction engine 62 may select one or more models for making a prediction, may train the models, and may produce a prediction (or solution) using a dataset retrieved from the database(s) 18.

As is illustrated in FIG. 2, database system 120 may include one or more databases 18. A database 18 may refer to a collection of information that may be specially organized for search and retrieval by the database management system 14. The database 18 may be stored as a set of files on, for example, magnetic disk or tape, optical disk, or some other secondary storage device. The information in these files may be broken down into records, each of which may consist of one or more fields. The database 18 may be any type of database. For example, the database 18 may be a relational database (e.g., Oracle database, MySQL, Microsoft SQL Server, PostgreSQL, DB2, etc.), or a non-relational database/NoSQL database (e.g., Redis, Amazon DynamoDB, etc.). Database system 120 may include any number of databases 18. Furthermore, the database 18 may be a distributed database.

The database 18 may be connected to the database management system 14 over a communication network (e.g., all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components). This may allow the database management system 14 to communicate with the database(s) 18 to merge data into the database(s) 18, and to retrieve data.

Database 18 may store internal data 22. Internal data 22 refers to internally collected data. For example, the database 18 may be a database utilized by an insurance company. In such an example, the internal data 22 may be data that was internally collected by the insurance company. Although internal data 22 is described above (and herein) as being data associated with insurance, the internal data 22 may be any other data, such as data associated with any other technology or field (e.g., engineering fields, construction fields, legal field, medical field, educational field, etc.).

In some examples, the internal data 22 may be structured data. This structured data may be highly organized data residing in a fixed field within a record or file, such as data contained in relational databases and spreadsheets. As examples, the structured data may be defined by a row/column that organizes the data, a table, semi text (e.g., XML), and/or pre- defined formats.

As is also illustrated in FIG. 2, database system 120 may include one or more external data sources 26 (e.g., external data sources 26a - 26n). An external data source 26 may refer to a source of externally collected data. For example, when the database 18 is utilized by an insurance company, the external data source 26 may be a source of data that is collected by any other company, person, or entity that is not the insurance company and/or that is not affiliated with the insurance company. In such an example, the external data source 26 may be an external website, a newspaper, a library, a school, or any other company, person, or entity that is not the insurance company. The external data source 26 may be a computing system (e.g., a computer, a server, a phone), a database, a cache of audio files, any other piece of hardware and/or software that stores data, or any combination of the preceding.

The external data source 26 may be connected to the database management system 14 over a communication network (e.g., all or a portion of the PSTN, a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components). This may allow the database management system 14 to communicate with the external data source 26 to fetch data.

The external data source 26 may store (or otherwise have) external data 30. External data 30 refers to externally collected data. For example, when the database 18 is utilized by an insurance company, the external data 30 may be data that was collected by any other company, person, or entity that is not the insurance company and/or that is not affiliated with the insurance company. Although external data 30 is described above (and herein) as being data associated with insurance, the external data 30 may be any other data, such as data associated with any other technology or field (e.g., engineering fields, construction fields, legal field, medical field, educational field, etc.).

In some examples, the external data 30 may be structured data. In other examples, the external data 30 may be unstructured data (or semi-structured data). This unstructured data may be information that either does not have a pre-defined data model or that is not organized in a pre-defined manner. Examples of unstructured data include images, videos, written or typed text, audio files, etc. Because the external data 30 is unstructured (or semi-structured), it may usually not be compatible with the database 18 (which typically utilizes structured data). As is discussed in more detail in parent application 16/146,590, this external data 30 may be transformed so that it may be merged into the database 18.

In some examples, the external data 30 may be collected, aggregated, and reported by the external data source 26 as data and data attributes in different ways, at different cadences, at different levels of detail, for different geographies, and in different formats. This may result in the external data 30 having a different granularity than the internal data 22 stored in the database 18.

Figure 3:
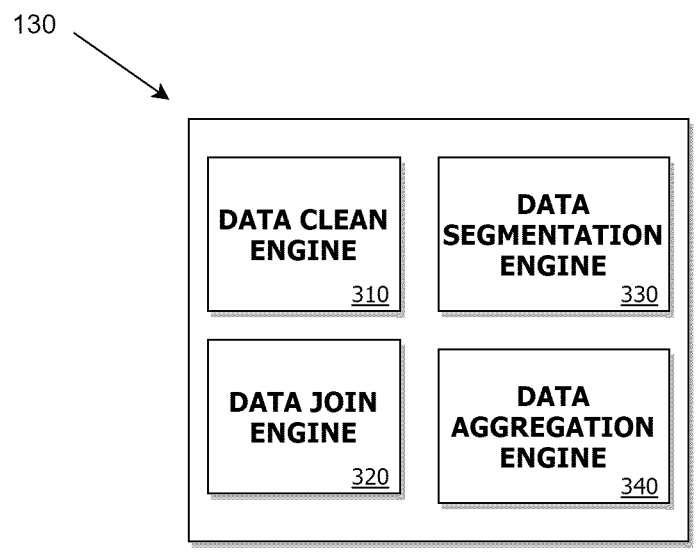
FIG. 3 is a schematic illustration of one example of a data processing system.

FIG. 3 is a schematic illustration of one example of a data processing system 130. As is illustrated, the data processing system 130 may include a data clean engine 310, a data join engine 320, a data segmentation engine 330, and a data aggregation engine 340. The data processing system 130 and any of its components may be implemented software, hardware, or a combination thereof.

Data clean engine 310 is configured to clean the data, e.g., by standardizing data types and values, removing duplicated variables, removing variables with a unique value, and removing obviously non-predictive variables (e.g., user id, etc.).

Data join engine 320 is configured to join data from various data tables in the database system 120, so data for relevant real world entities (e.g., conversion prospects), events (e.g., claims), etc., are collected together for easier aggregation by data aggregation engine 340.

Data segmentation engine 330 is configured to segment the data into groups. In one embodiment, e.g., for automobile insurance policies, the data may be segmented based on states, predetermined groupings of states, or other geographical areas as described in more detail herein. Data segmentation engine 330 may also segment the data based on clusters determined by data clustering system 180.

Data aggregation engine 340 is configured to aggregate the data to the desired granularity. The appropriate granularity will depend on the type and structure of the input variables and the target. For prediction of conversion, a prospect granularity may be used.

Figure 4:
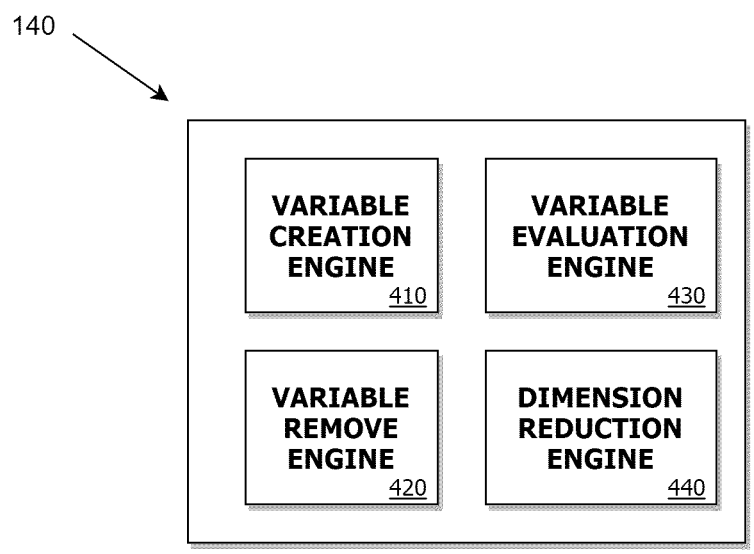
FIG. 4 is a schematic illustration of one example of a feature engineering system.

FIG. 4 is a schematic illustration of one example of a feature engineering system 140. As is illustrated, the feature engineering system 140 may include a variable creation engine 410, a variable remove engine 420, a variable evaluation engine 430, and a dimension reduction engine 440. The feature engineering system 140 and any of its components may be implemented software, hardware, or a combination thereof.

Variable creation engine 410 is configured to add additional variables to the data set. Such added variables will generally be combinations of or comparisons between existing variables in the data set. For example, ratio variables, which compare one variable to one or more other variables, may be created.

Variable remove engine 420 is configured to remove variables from the data set. For example, variables with incomplete or sparse data, variables with low variance, highly correlated variables, and noisy variables may be removed from the dataset. Other variables may also be removed, depending on the needs of a particular industry. For example, in the auto insurance industry, variables related to driving history older than three years may be removed.

Variable evaluation engine 430 is configured to determine the relative contribution of each of the variables in the data set in predicting the target value. In one embodiment, variable evaluation engine 430 may determine this by creating multiple preliminary models using the dataset, and determining the contribution of each of the input variables to the target. In embodiments where the input data is divided between a training data set and a testing or evaluation data set, this evaluation of the input variables in performed only on the training set so the variables input into the model remaining consistent across the training and testing set.

Dimension reduction engine 440 is configured to reduce the dimensionality of the variables of less importance, as determined by the variable evaluation engine 430. The dimension reduction may be performed by techniques such as principal component analysis (PCA), singular value decomposition (SVD), or by an autoencoder.

Figure 5:
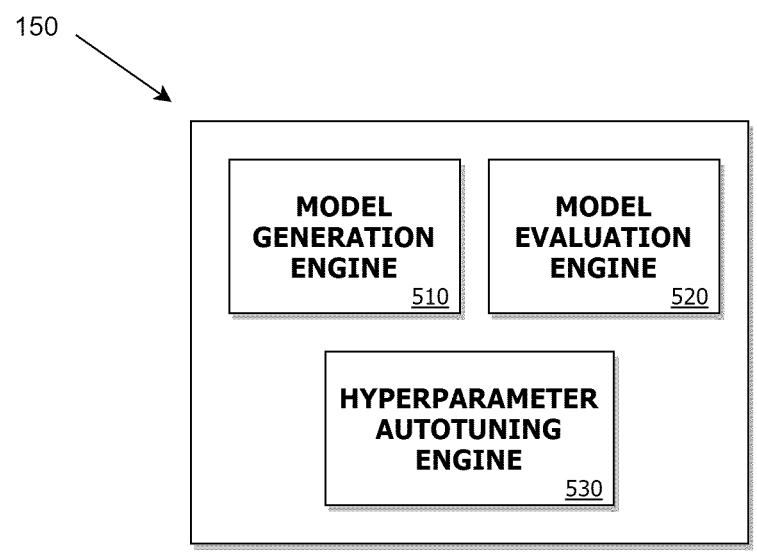
FIG. 5 is a schematic illustration of one example of a model training/creation system.

FIG. 5 is a schematic illustration of one example of a model creation system 150 or a look-a-like model creation system 155. As is illustrated, the model creation system 150 may include a model generation engine 510, a model evaluation engine 520, and a hyperparameter autotuning engine 530. The model creation system 130 and any of its components may be implemented software, hardware, or a combination thereof.

The model generation engine 510 is adapted to generate and train a model based on a provided model type, provided hyperparameters, and a historical data set. Multiple model generation engines 510 may be included in model creation system 150 for use in training different model types, e.g., model generation engines 510 may include a multiple layer perceptron (MLP) model generation engine, a decision tree model generation engine, an association rule mining model generation engine, a kNN model generation engine, a Prophet model generation engine, a long short term memory (LSTM) model generation engine, a convolution neural network (CNN) model generation engine, etc.

The model evaluation engine 520 is adapted to evaluate the accuracy of models created by the model generation engine 510. The methods used to perform the evaluation depend on the type of model created, but generally include a comparison of the expected target (from the historical data) with the target generated by the model. The comparison may be made by using techniques such as MAE (mean absolute error), RMSE (root mean square error), etc.

The hyperparameter autotuning engine 530 is adapted to tune the hyperparameters of the models. The number and type of hyperparameters depend on the type of model. For MLP models, hyperparameters include numbers of layers, size of layers, number of nodes, number of hidden units, activation function, learning rate, momentum, etc. In one embodiment, the hyperparameter autotuning engine 530 may comprise multiple GPUs that generate many variations of a model, each with different hyperparameters. The variations may then be tested (e.g., by the model evaluation engine 520) to determine the best or most acceptable model. The hyperparameter autotuning engine 530 may use the model generation engine(s) 510 and the model evaluation engine 520 for creation and evaluation, respectively, of each variation of the model.

Modifications, additions, or omissions may be made to the above systems without departing from the scope of the disclosure. Furthermore, one or more components of the systems may be separated, combined, and/or eliminated. Additionally, any system may have fewer (or more) components and/or engines. Furthermore, one or more actions performed by a component/engine of a system may be described herein as being performed by the respective system. In such an example, the respective system may be using that particular component/engine to perform the action.

The methods and systems discussed herein may be used with any type of data. For example, the methods and systems discussed herein may be used with data associated with oil production, or data associated with any other technology or field (e.g., engineering fields, construction fields, legal field, medical field, educational field, insurance field etc.). Additional details regarding the use of these methods and systems in the insurance field are included below. These details are provided as an example, and are not limited to the insurance field.

Risk-based pricing requires insurance companies to look into the future to determine how much the company needs to charge customers in order to reach a target profit at both the overall and the individual level, and how to shape demand of desired or undesired customers.

At the aggregate level, the rate maker's job is to ensure that the total premium for all policies written is sufficient to cover the total expected losses and expenses and to provide for the targeted profit. At the individual risk or segment level, Principle 3 of the CAS "Statementof Principles Regarding Property and Casualty Insurance Ratemaking" states "A rate provides for the costs associated with an individual risk transfer." A customer that presents significantly higher risk of loss (whether in loan default, marketing spend required to acquire, or insurable losses) should have a higher price charged than a customer that represents a significantly lower risk of loss.

For example, in insurance the primary component of an insurer's profit equation is the portion of an insurance rate used to cover claims and the costs of adjusting claims, known as loss costs. Loss costs have two primary components: (1) Frequency: the rate at which claims are being made; and (2) Severity: the size of the claim.

At the aggregate level, companies determine their prices by analyzing future loss costs and adding provision for inflation, expenses, profit, and contingencies. Most state insurance regulators require insurers to file these rate structures and to receive prior approval for every insurance product and coverage the company intends to sell to consumers living in the state. Accurate and defensible projections of loss trends are key components to the regulatory approval process.

At the individual level, premium is calculated based on a given rate per unit of risk exposed, and can vary significantly for risks with different characteristics. Units of risk are determined by rating variables, characteristics which are believed to have statistically relevant correlations to risk. Examples of variables used by auto insurers include where the vehicle is located, driving record, vehicle make, model, and age, prior insurance or gaps in insurance, age, gender, marital status, occupation, and education to name a few. Rates for any given unit of risk exposed are derived by applying a combination of proprietary company business rules, rate tables, and underwriting guidelines that have developed over time to the rating variables.

A more comprehensive basis from which to forecast customer risks at the aggregate level, and from which to base pricing at the coverage or policy level, is required to improve the efficiency and accuracy of targeting, acquiring, pricing, and servicing customers. Data is at the core of this more comprehensive basis.

Specifically, the methods and systems described herein provide a more comprehensive accounting of both the particular and the fundamental components of risk, which is defined herein as risks with outcomes that can be measured in financial terms. A more comprehensive accounting of the components of risk, in turn, requires a broader and more detailed set of descriptive attributes, and a more granular measurement of and accounting for these attributes in both time and space.

As an example, during the insurance application process, companies tend to collect the minimum data required to quote, bind, and issue the policy, henceforth referred to herein as the "application process," with data referred to herein as "internal data." The depth and breadth of this internal data will vary depending on the state in which the policy is issued, the channel through which it is bought or sold, and the coverage(s) being purchased. Regardless of company, coverage, channel, and State of issuance, the type of policyholder attributes collected during the application process typically include, but are not limited to: (1) Basic personal identifying information, such as name, address, contact information, and Social Security Number (SSN), gender, and birth date; and (2) Basic demographic attributes such as marital status, occupation, and income.

The data collected relating to the insured risk, whether property (any asset) or casualty (any liability) will vary by coverage, by State, and by issuing company. Examples of the types of data collected during the application process include, but are not limited to, the following. In auto insurance, the data collected may include vehicle data (e.g., Make, Model, Year, Ownership: lease or own, Use – business or personal, Vehicle features: Anti-theft deterrents, accident avoidance, other vehicle safety features), driving behavior (e.g., annual miles driven, accident history, moving violations history), household data (e.g., number and ages of licensed drivers, number of insured vehicles), current insurance carrier and history (if applicable). In homeowner insurance, the data collected may include: structure location; structure attributes (e.g., structure type/use, construction year, construction quality, square footage); assessed tax value; estimated replacement cost; age and condition of key systems and/or components such as plumbing, electrical, and roof); and presence of risk factors such as animals with bite history, pools, trampolines, and presence or absence of gates, fencing, controlled access, etc.

Internal data collected during the application process and occasionally refreshed or updated (either during renewal, during the claims process, offered voluntarily by the policyholder, or proactively requested by the insurance carrier) are only partial descriptions of some elements of the insured risk, but ignore the fact that the risk posed by the insured party, asset, peril, and/or liability are inseparable from the physical environment, local community, and social fabric in which they exist, and with whom they interact every day. Insured risks do not exist in a vacuum; they are subject to dynamic intrinsic and extrinsic environmental, economic, societal, behavioral, and natural forces at all times. Little, if any, of these elements are captured or otherwise accounted for during the ratemaking process, either at the policy-level or the aggregate level for reasons detailed above.

A more comprehensive, detailed, precise, and/or accurate accounting of the intrinsic and extrinsic influencers that contribute to the particular and fundamental components of financial risk require that the insurer's internal data be augmented, which, as described earlier, amount to an accounting of a small number of isolated attributes describing basic personal and property risk. The classes of data used to augment internal data is referred to herein as "external data," while together, the combination of internal and external datasets is herein referred to as the "360-Degree Database." Examples of classes (or categories) of external data components of the 360-Degree Database include, but are not limited to, the following: Geo- Demographic, Geo-Economic, Geospatial, Traffic, Weather, Catastrophes and Natural Disasters, Public Health and Safety, Legal and Regulatory, Societal, Industry Benchmarks, Insured Asset Class data, Insured Party Financial data, and Insured Party Behavioral data. The term "insured party" can represent an individual, a household, a business or other entity.

Figure 7:
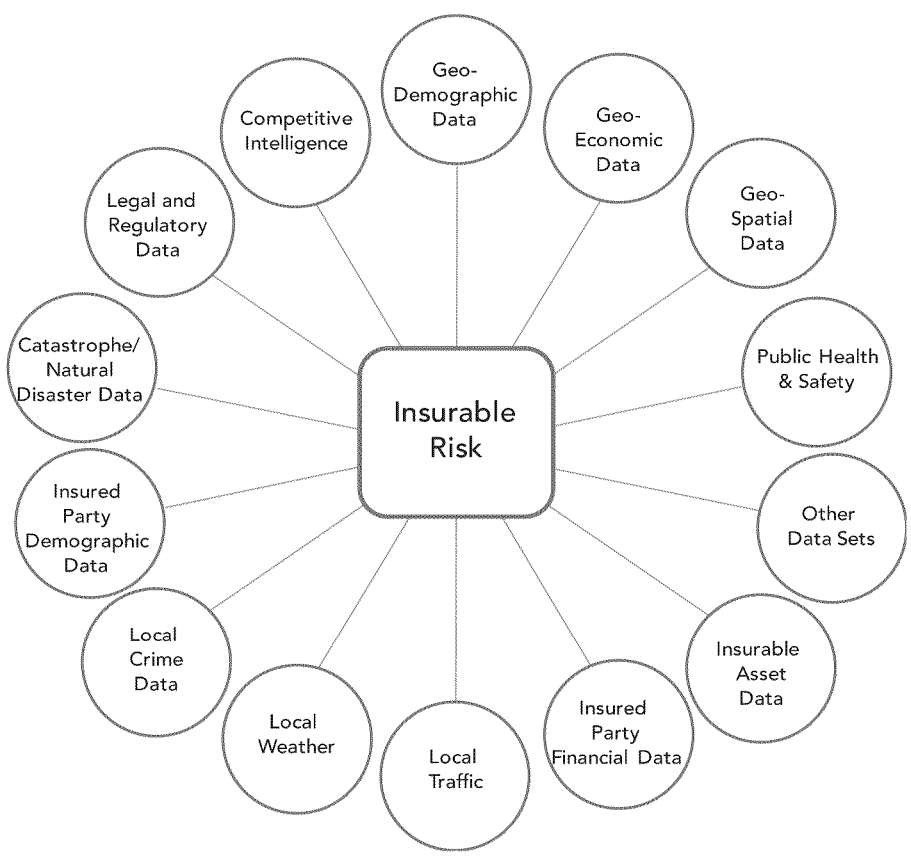
FIG. 7 illustrates types of data that may feed superior assessments of risk in the database.

FIG. 7 provides an example of the kinds of data that may feed superior assessments of risk in the database 120 of FIG. 1. FIGS. 6A-6Q provide additional information regarding examples of data that may be included in the 360-Degree Database. The external data may be retrieved from any of a number of external, third-party databases, from government and industry sources. For example, industry sources such as Acxiom, CoreLogic, Datalogix, etc., can provide specific additional information regarding individuals and households. Government sources, e.g., the Census Bureau, the National Highway Traffic Safety Administration (NHTSA), etc., can provide general demographic, traffic, and accident information for particular geographical regions. Such external can be combined with the internal data for insured parties to provide superior predictions.

Not only can the 360-Degree Database store internal and external data for insured parties, it can also store and/or use any available external information for prospects. Prospects can be divided into two primary categories, those who have interacted with the system in some way (e.g., by requesting an insurance quote, making an inquiry regarding insurance, talking to an insurance agent, having a text chat with an insurance agent, starting to fill out an online application for insurance, etc.), and a broader pool that includes all individuals for which external data exists. Predictions regarding the likelihood of conversion, and the time and/or cost of conversion may be made for prospects using the techniques described herein.

The 360-Degree database enables a finer granularity for both geographic data and temporal data. Insurers required to submit rate structures to State regulators base the structures on state-wide loss-cost projections by coverage, and from time to time, other subcategories including, but not limited to, sales channel. Aggregating risk data and claims experience data at the state level in order to project loss costs and loss trends and create state-specific rate structures ignores vital regional, local, and/or hyper-local differences between and among geographic, demographic, economic, and other distinguishing characteristics. Using the state of Texas as an example, the interior border city of El Paso is different in almost every meaningful way when compared to a major coastal metropolitan city like Houston. Each city represents an entirely different risk profile. A more representative methodology aggregates data at a much finer grain – at minimum, at the Metropolitan Statistical Area (MSA) level, and ideally at the Zip Code Tabulation Area (ZCTA) level. In order of granularity, or degree of refinement, from least detailed to most detailed, includes but is not limited to the following:

Metropolitan Statistical Area: As of this writing, the United States Office of Management and Budget (OMB) has defined 388 Metropolitan Statistical Areas (MSAs) for the United States and seven for Puerto Rico. The OMB defines a Metropolitan Statistical Area as one or more adjacent counties or county equivalents that have at least one urban core area of at least 50,000 population, plus adjacent territory that has a high degree of social and economic integration with the core as measured by commuting ties. A list of MSAs may be found at https://en.wikipedia.org/wiki/List_of_Metropolitan_Statistical_Areas, and a map of MSAs may be found at https://www.census.gov/geo/maps-data/map s/cb s ac s a.html.

Micropolitan Statistical Area: As of this writing, the United States Office of Management and Budget (OMB) has defined 536 Micropolitan Statistical Areas (µSAs) for the United States and five for Puerto Rico. The OMB defines a Micropolitan Statistical Area as one or more adjacent counties or county equivalents that have at least one urban core area of at least 10,000 population but less than 50,000, plus adjacent territory that has a high degree of social and economic integration with the core as measured by commuting ties. A list of µSAs may be found at:

https://en.wikipedia.org/wiki/Micropolitan_statistical_area. A map of µSAs may be found at: https://www.census.gov/geo/maps-data/maps/cbsacsa.html.

Combined Statistical Area: Together, Metropolitan Statistical Areas and Micropolitan Statistical Areas combine to form Combined Statistical Areas (CSAs.) A combined statistical area (CSA) is composed of adjacent metropolitan (MSA) and micropolitan statistical areas (µSA) in the United States and Puerto Rico that can demonstrate economic or social linkage. The United States Office of Management and Budget defines a CSA as consisting of various combinations of adjacent metropolitan and micropolitan areas with economic ties measured by commuting patterns. These areas that combine retain their own designations as metropolitan or micropolitan statistical areas within the larger combined statistical area.

The primary distinguishing factor between a CSA and an MSA/µSA is that the social and economic ties between the individual MSAs/µSAs within a CSA are at lower levels than between the counties within an MSA. CSAs represent multiple metropolitan or micropolitan areas that have an employment interchange of at least 15% with the central county or counties of the parent MSA/µSA. CSAs often represent regions with overlapping labor and media markets. A list of Combined Statistical Areas may be found at: https://en.wikipedia.org/wiki/Combined_statistical_area. A map of Combined Statistical Areas may be found at: https://www.census.gov/geo/maps-data/maps/cbsacsa.html. A delineation may be found at:

https://www.census.gov/programs-surveys/metro-micro/geographies/geographic-reference-files.html.

Core-Based Statistical Area – As of this writing, the United States Office of Management and Budget (OMB) has defined 917 core-based statistical areas (CBSAs) for the United States and 12 for Puerto Rico. The OMB defines a core-based statistical area as one or more adjacent counties or county equivalents that have at least one urban core area of at least 10,000 population, plus adjacent territory that has a high degree of social and economic integration with the core as measured by commuting ties. The 929 Core Based Statistical Areas currently defined by the OMB include the 388 metropolitan statistical areas (MSAs), which have an urban core population of at least 50,000, and the 541 Micropolitan statistical areas (μSAs), which have an urban core population of at least 10,000 but less than 50,000.

Zip Code Tabulation Area – Zip Code Tabulation Area (ZCTAs) are generalized area representations of the United States Postal Service (USPS) ZIP code service areas, but are not the same as ZIP codes. Individual USPS ZIP codes can cross state, place, county, census tract, census block group and census block boundaries, so the Census Bureau asserts that "there is no correlation between ZIP codes and Census Bureau geography". Each ZCTA is constructed by aggregating the Census blocks whose addresses use a given ZIP code. In assembling census statistical units to create ZCTAs, the Census Bureau took the ZIP code used by the majority of addresses in each census unit at the time the data was compiled. As of this writing, there are approximately 32,000 ZCTAs.

Exact Latitude/Longitude – Geo-Positioning Satellites and other location mapping technology makes it possible to pinpoint values to exact locations, represented by latitude and longitude.

Generally, any exposure, defined herein as the intrinsic and extrinsic factors pertaining to any financial risk, that subject that risk to loss from some hazard or contingency, are not only localized, but also vary significantly from day to day, even hour to hour. Morning rush hour commuters face very different risks than do midnight shift workers on their daily commutes to work. The risk to both is different on a typical Sunday than on a typical Monday. Likewise, any structure's exposure to the risk of fire is different on July 4$^{th}$ than on most other days during the year. Residents in New York state's lake-effect snow belt contend with much different seasonal driving conditions than do residents of Manhattan. As such, values for each internal and external data attribute must be accounted for on at minimum a daily basis. More granular temporal designations –hourly, for instance, or in some cases, in real time, are possible and preferable in cases including but not limited to local weather events, local traffic flow, and local traffic congestion metrics.

To best use the additional data gathered by the system, more detailed models need to be created that take into account the additional data. To this end, the disclosed systems and methods can generate one or more classifications models and/or regression models, including, but not limited to, perceptrons, logistic regression, feedforward neural networks (i.e., multilayer perceptrons), recurrent neural networks, deep neural networks (e.g., convolutional neural networks), Markov chains, time series models, state space models, Bayesian models, decision trees, association rule mining models, support vector machines, or any other appropriate model. Combinations or ensembles of models, e.g., by bagging, boosting, random forest techniques, etc., may also be used.

The specific heuristics, algorithms, and/or types of neural network to be used for any particular model may be selected based on the type of input data, and/or the historical success of using the heuristics, algorithms, or neural networks with respect to the input data. Any required hyperparameters (e.g., numbers of layers, size of layers, number of nodes, number of hidden units, activation function, learning rate, momentum, etc.), for the heuristics, algorithms, and/or neural networks may be similarly selected.

After the heuristics, algorithms, and/or neural networks are selected, they may be trained based on historical data. Multiple models may be generated and trained, and a best fit model may be selected from the multiple trained models to be used.

Figure 8:
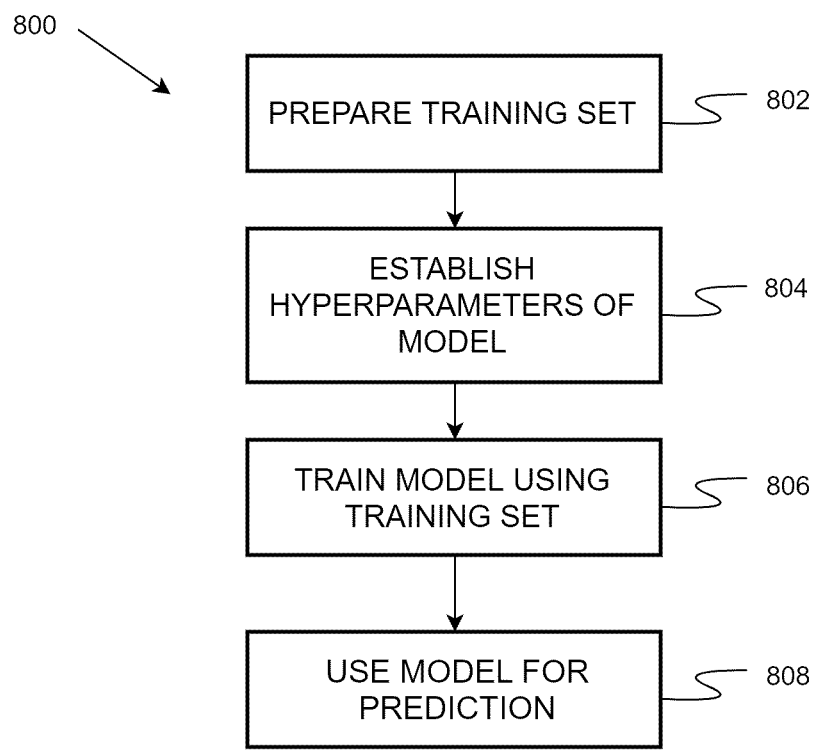
FIG. 8 illustrates an example method for model creation.

FIG. 8 illustrates an example method 800 for generating a model, that may be used, e.g., by model creation system 150. In this example, a neural network model is being created, though other types of models may be used. In step 802, historical data is used to prepare training sets. Each training set may comprise one or more input data points and target data point, both from the historical data.

In step 804, the hyperparameters of the model can be established, including the number of layers and neurons, the number of epochs (e.g., complete passes through the training set), optimizations, error functions, etc.

In step 806, the model may be trained using the training set prepared in step 802.

In step 808, the model may be used for prediction.

Figure 9:
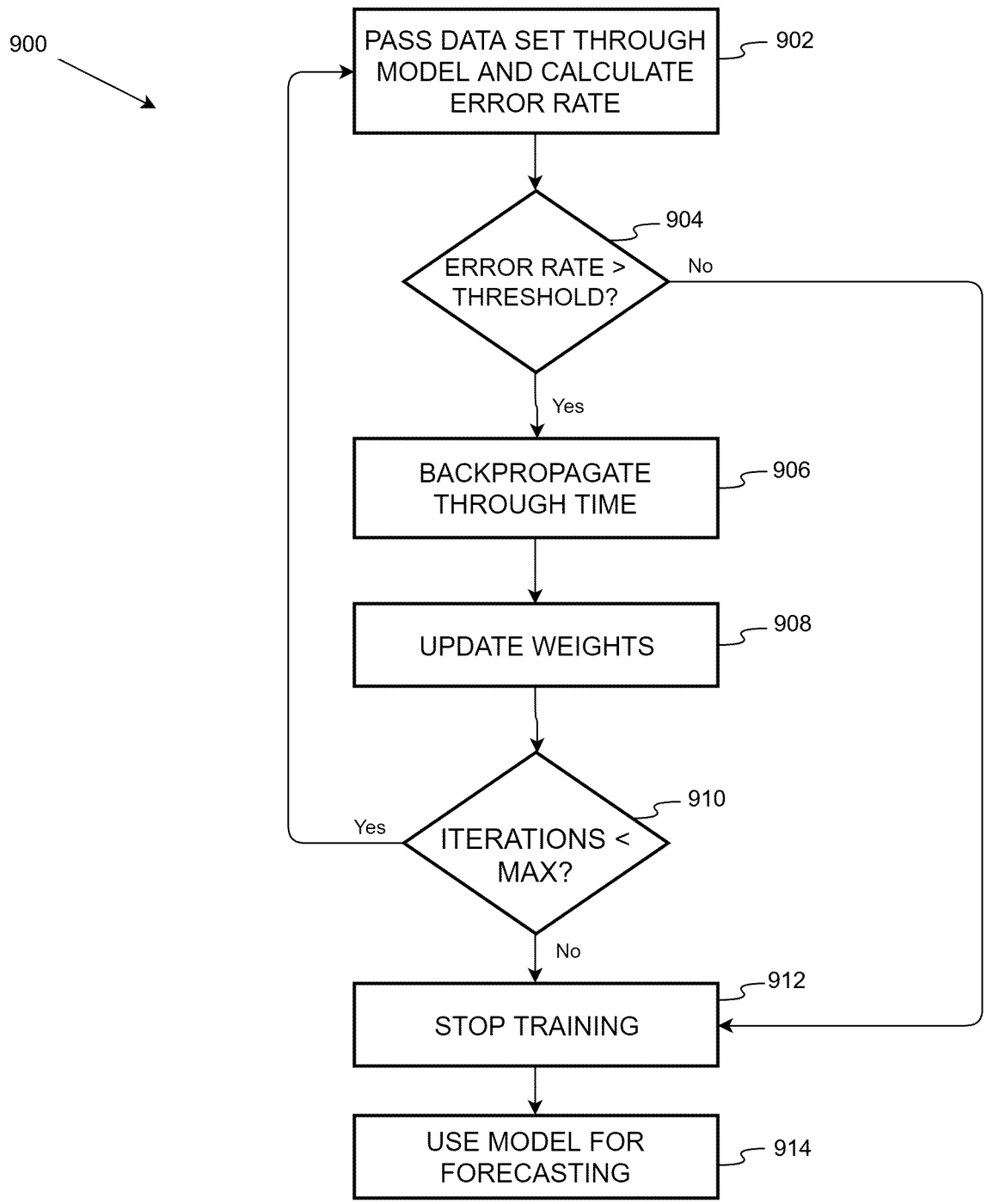
FIG. 9 illustrates an example method for training of a neural network model.

FIG. 9 illustrates one embodiment 900 of training a model (see FIG. 8 at step 806). In step 902, the data set is passed through the model, and an error rate as compared to a target output is determined.

In step 904, the error rate is compared to a threshold. If the error rate is not less than (i.e., greater than) the threshold, backpropagation through time may be used to calculate gradients for the connections between the neurons, as illustrated at step 906. In step 908, weights within the neural network can be updated based on the calculated gradients.

In step 910, the number of iterations is compared to a maximum number (e.g., the predetermined number of epochs), and if it has not been reached, the method returns to step 902 to perform another training iteration. Once the maximum number of iterations has been hit or the error threshold has been achieved, the training can stop in step 912, and the model can then be used for prediction, as illustrated at step 914.

The inputs used for the model may be determined by one or more data analysis methods, such as identifying input variables that influence the desired output, identifying input variables that influence other input variables, etc.

Third party data collections and/or databases contain tremendous amounts of data for each individual and/or address in the country. This data can be leveraged, using specially trained or constructed models, to predict which of the over 200 million prospects is most likely to convert. The data include data regarding each prospect's social media habits, recent life events, income, debts, assets, buying patterns, individual and household characteristics, demographics, and interests.

In more detail, the available information for each prospect may include personal information (e.g., gender, education level, occupation, consumer prominence, etc.), financial information (e.g., types of insurance owned (e.g., life, auto, home, etc.), economic stability, income, net worth, etc.) buying activity (e.g., types of products purchased and purchase frequency), travel information, television viewing habits, credit card use, gambling propensity, buying channel preferences, technology information (e.g., type of internet connection, internet provider, use and/or ownership of technological devices such as cell phone and computers, etc.), real property information (e.g., mortgage information (e.g., amount, type, interest rate), purchase date, lot size, home size, number of rooms, exterior type, roof type, market value, year built, is there a pool, etc.), household information (age, occupation, gender, marital status, etc., for each household member), voting information, political registration, household vehicle information (e.g., year, make, and model of each car in the household), interests, recent life events (e.g., home purchase, home mortgage taken out, new child, child near graduation, college graduation, marriage, divorce, etc.).

The available information for each prospect may also include the data categories listed in FIGS. 6A through 6Q (e.g., geo-demographic, geo-economic, traffic, traffic incidents, weather, severe weather, catastrophes, public safety, public health, regulatory, industry benchmarking, social and behavioral, consumer financial, vehicle history, assets, etc.) may also be useful in prediction conversion likelihood. This data may be received or retrieved from external data sources 26, which may comprise any store of the described types of external data.

Weather data may also include atmospheric pressure, cloud type, dew point, solar zenith angle, DNI (direct normal irradiance), DHI (diffuse horizontal irradiance), GHI (global horizontal irradiance), clearsky DNI, clearsky DHI, clearsky GHI, and other measurements of solar radiation.

Traffic data may also include statistical data (e.g., traffic volume trends) compiled by the Office of Highway Policy Information (part of the FHWA) and traffic fatality data compiled by the National Highway Traffic Safety Administration. The traffic fatality data may include detailed information about each incident, e.g., time, location, location description (e.g., information about where the incident occurred), the atmospheric conditions, incident information (e.g., number of people and vehicles involved, whether safety devices (e.g., seatbelts, air bags, helmets) were used/deployed, number of fatalities, type of collision, seating position of occupants, extent of damage (including any fire damage), types of hazardous materials involved (if any), if incident was a hit-and-run, whether incident was holiday related, details regarding the incident progression (e.g., events pre-collision, sequence of events during collision, etc.), vehicle rollover information, occupant ejection information, etc.), vehicle information (e.g., make, model, year, body type, etc.), driver information (e.g., height, weight, race, sex, age, prior infractions or accidents, license status and type, prior license suspensions, etc.), outcome information (e.g., arrive time of EMS, time of death, etc.), contributing factors (e.g., driver distractions, vision obstructions, driver impairment factors (e.g., alcohol, drugs, etc.), avoidance maneuvers, vehicle speed), etc.

Geo-demographic data may also include data regarding employment rates for males and females 16 and older, data regarding health insurance coverage, and census data (e.g., household data, school enrollment, educational attainment, veteran status, disability status, place of birth, citizenship status, language spoken at home, ancestry, etc.).

The available information may also include data regarding fuel prices of different fuel formulations in region of the country, states, cities, or other geographical areas.

The data may be collected on specified time and geographic granularities. For example, weather data may be collected on a time granularity of daily, and a geographic granularity of zip code. Possible time granularities include quarter-hourly, hourly, daily, weekly, monthly, quarterly, annually, etc. Possible geographic granularities include states, groups of states, and other geographic regions as described in more detail elsewhere herein.

In certain embodiments (e.g., for predicting the length of time before conversion or the number of iterations before conversion), inquiry and quote data may also be used. This includes actual quotes (e.g., for auto, home, and/or liability insurance, etc.), quote evolution over time, asset data (e.g., for the vehicle, home, etc., being insured), driver data (for auto insurance), premium and deductible data for the quoted policy, policy discounts, household data, data re existing policies of the prospect receiving the inquiry and/or quote, and information regarding the agent or other channel providing the inquiry or quote.

All of this data can be used by the 360-degree database to identify look-alike customers and predict likelihood of conversion. The data may also be used to predict the cost of conversion, number of marketing iterations, and/or total time required to get a given prospect to complete a business transaction, e.g., purchase an insurance policy. Methods for identifying look-alike customers and predicting conversion outcomes according to the principles of the current inventions are described with respect to FIGS. 10 through 19.

Figure 10A:
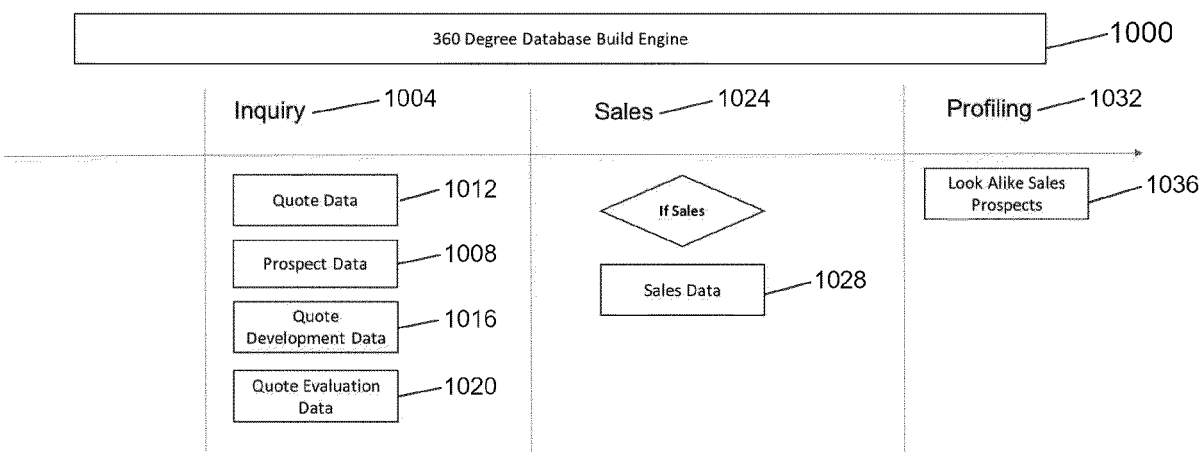
FIGS. 10A-10B illustrate examples of predicting likelihood, cost, and marketing iterations required to get a given prospect to convert.
Figure 10B:
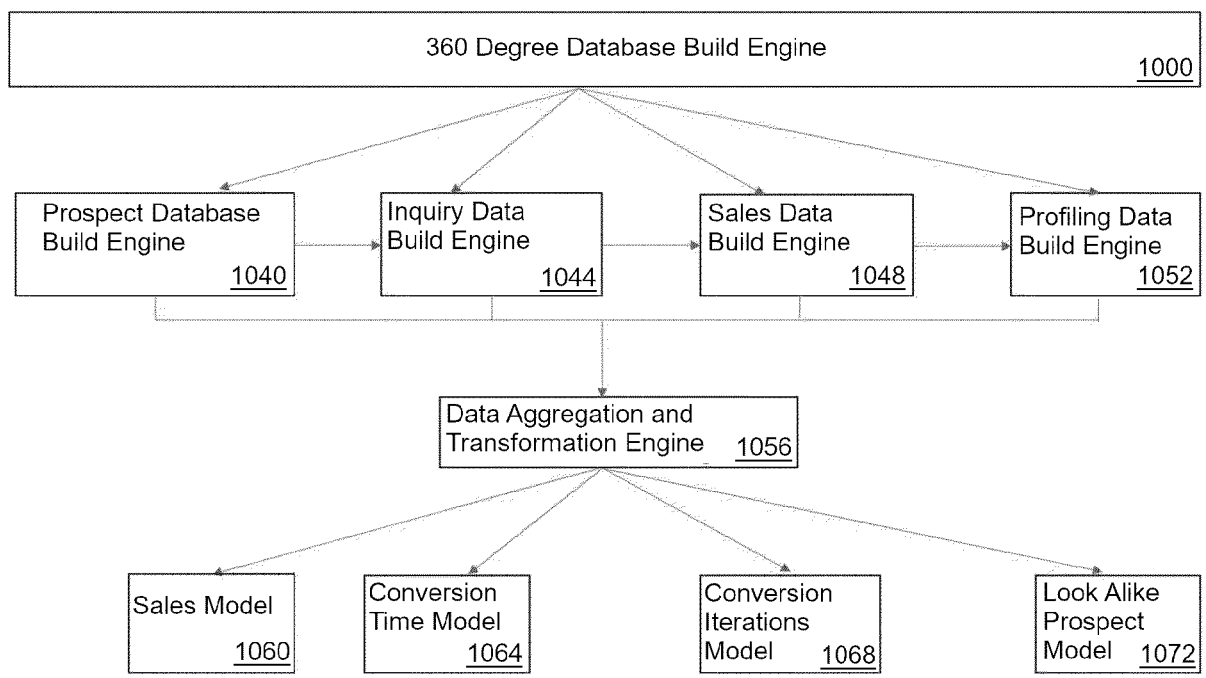

FIGS. 10A-10B illustrate examples of projecting likelihood/cost/marketing iterations required to get a given customer to respond or complete a business transaction.

Referring to FIG. 10A, 360 Degree Database Build Engine 1000 refers to the components of database management system 14 that are involved in the creation and updating of the 360-degree database, e.g., data fetch engine 38, data transformation engine 42, data merge engine 46, and database update engine 50. As shown, at the inquiry stage 1004, prospect data 1008 (e.g., the prospect's ID, name, and other information) and quote data 1012 (information about the quote generated as a result of the inquiry, e.g., monthly cost, term, etc.) is added to the 360-degree database and associated with the prospect.

As the inquiry is developed, quote development data 1016 may also be stored. Quote development data includes the history of the quotes given to the prospect, and may include the rates the prospect has been quoted, the times of the quotes, and the quote characteristics. Quote evaluation data 1020, data representing the completeness and/or uniqueness of a quote, may also be stored. In an embodiment, incomplete or non-unique quotes may instead be removed from the dataset.

If the prospect is converted and a sale occurs at the sales stage 1024, data related to the sale 1028 (e.g., cost of the sale, sale date, monthly/yearly premium, expected sale value, etc.) may be saved to the 360-degree database.

After the inquiry data and sale data is saved to the 360-degree database, profiling stage 1032 may occur. At the profiling stage, models may be generated using the saved prospect, inquiry, and sale data. For example, a model that predicts the likelihood of conversion for prospects that have not interacted with the system may be created. Also, models that predict aspects of the conversion process for a prospect who has interacted with the system (e.g., received a quote) may be created, e.g., models that predict the number of conversion iterations, the time before conversion, and the cost of conversion for the prospect. Look-a-like prospect models may also be generated.

Referring to FIG. 10B, prospect database build engine 1040, inquiry data build engine 1044, sales data build engine 1048, and profiling data build engine 1052 each convert the respective prospect, inquiry, sales, and profiling information into a format that can be stored in the database, so it can be merged with the information with the database.

The data from the build engines is then sent to data aggregation and transformation engine 1056, which combines and converts the data into a form that can be used to train one or more models, e.g., sales model 1060, conversion time model 1064, conversion iterations model 1068, and look-a-like prospect model 1072. After each model is trained, it can be used to predict an outcome for a particular prospect.

Figure 11:
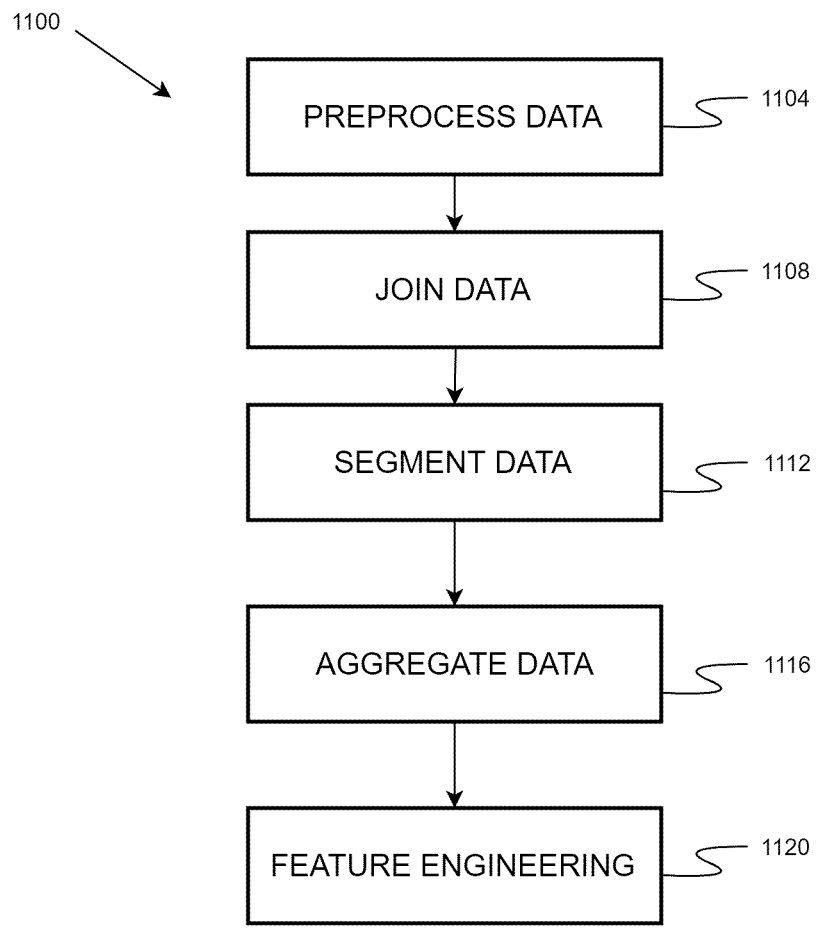
FIG. 11 illustrates an example method for preparing data for training a conversion time model.

In an embodiment, the data aggregation and transformation engine 1056 may be configured to perform method 1100, as illustrated in FIG. 11. The method will be primarily explained with respect to a conversion time model, though the data preparation for sales models, conversion cost models, and conversion iterations models will be similar.

The historical data for sales model 1060 comprises all customers or other individuals/entities for which a conversion outcome is known by the company, e.g., current customers, prospects that made an inquiry or received a quote but did not convert, etc. The historical data includes all available data related to the prospect. However, inquiry and/or quote data is not used in training the model, as such data would not be available for prospects with no current relationship with the company.

Similarly, the historical (training) data for a conversion time model 1064 and conversion iterations model 1068 may comprise all customers or other individuals/entities for which a conversion time or iterations outcome is known by the company. The historical data includes prospect data, inquiry data, and quote data as described herein.

In step 1104, the historical data described above is pre-processed and cleaned, e.g., by standardizing data types and values, removing duplicated variables, removing variables with a unique value, and removing obviously non-predictive variables (e.g., user id, etc.). In an embodiment, this step is performed by data clean engine 310.

Variables with incomplete data may also be removed in this step. For example, a variable with data for only 50% of prospects may be removed. The threshold percentage value may change based on the application.

In step 1108, the historical data may be joined, so that all data related to a common database key is collected together for easier aggregation. The key may abstractly refer to an entity or event in the real world (e.g., a prospect) that is relevant to the prediction of the target (e.g., the conversion time of the prospect). In embodiments not using a relational database, data related to the real-world entity or event may be collected together in a different manner for easier aggregation. For example, in an embodiment for predicting the likelihood of conversion for prospects, personal data for the prospects may be joined with environmental and other data related to the location of the prospect.

In step 1112, the data may be segmented according to states, or other geographical regions as described above (e.g., Metropolitan Statistical Area, Micropolitan Statistical Area, Combined Statistical Area, Core-Based Statistical Area, Zip Code Tabulation Area, etc.). Groups of states or other geographical regions may also be used when there is not enough data for an individual state or geographical region. In embodiments where data is segmented, separate models are created for each segment, using the historical data from the respective segment.

In creating segments, groups of states (or other geographic regions) with similar features may be determined, and the data may be segmented accordingly.

In step 1116, the data for each segment is aggregated where necessary. Quote and inquiry data for a conversion time model, for example, may be aggregated to the individual prospect granularity.

How each variable is aggregated depends on the type of variable. Numerical variables are aggregated by calculating new statistical variables, e.g., median, mean, min, max, standard deviation, etc. Enumerated variables, i.e. variables that identify a status, indicator, code, etc., are aggregated by counting the number of each type. For example, policyholder marital status may be aggregated by counting the number of policyholders that are married, divorced, separated, never married, etc. In instances where the number of types is large, e.g., ages, the aggregate variables may divide the types into bins. For example, prospect ages may be aggregated into variables counting the number of prospects aged 16-17, the number of prospects aged 18-21, the number of prospects aged 22-25, etc. Boolean input variables are aggregated into counts of true and false.

After the data has been processed, the resulting dataset may include thousands of variables. However, some of the variables may have little or no influence on the target, i.e., do not have a string 'signal' with respect to the conversion time. Furthermore, some of the variables are highly correlated with other variables.

In step 1120, feature engineering is performed on the input variables to reduce the number of input variables from thousands to several hundred, while maintaining the overall signal of the data. In one embodiment, one or more test models are created using the input data, and the input variables with the most effect on the target are selected, e.g., in one embodiment between about 100 and about 150 variables are selected. Depending on the data, the top 100 - 150 variables can account for between about 60% and about 95% of the effect on the target. After the top variables are selected, an autoencoder may be used to consolidate the remaining variables into a smaller number of variables, e.g., about 10 to about 20 variables. This is useful to keep the signal of the remaining variables. Feature engineering is described in more detail with respect to FIG. 12.

In an alternative embodiment, the steps of this method may be performed by data processing system 130 (e.g., data clean engine 310, data join engine 320, data segmentation engine 330, and data aggregation engine 340) instead of data aggregation and transformation engine 1056.

Figure 12:
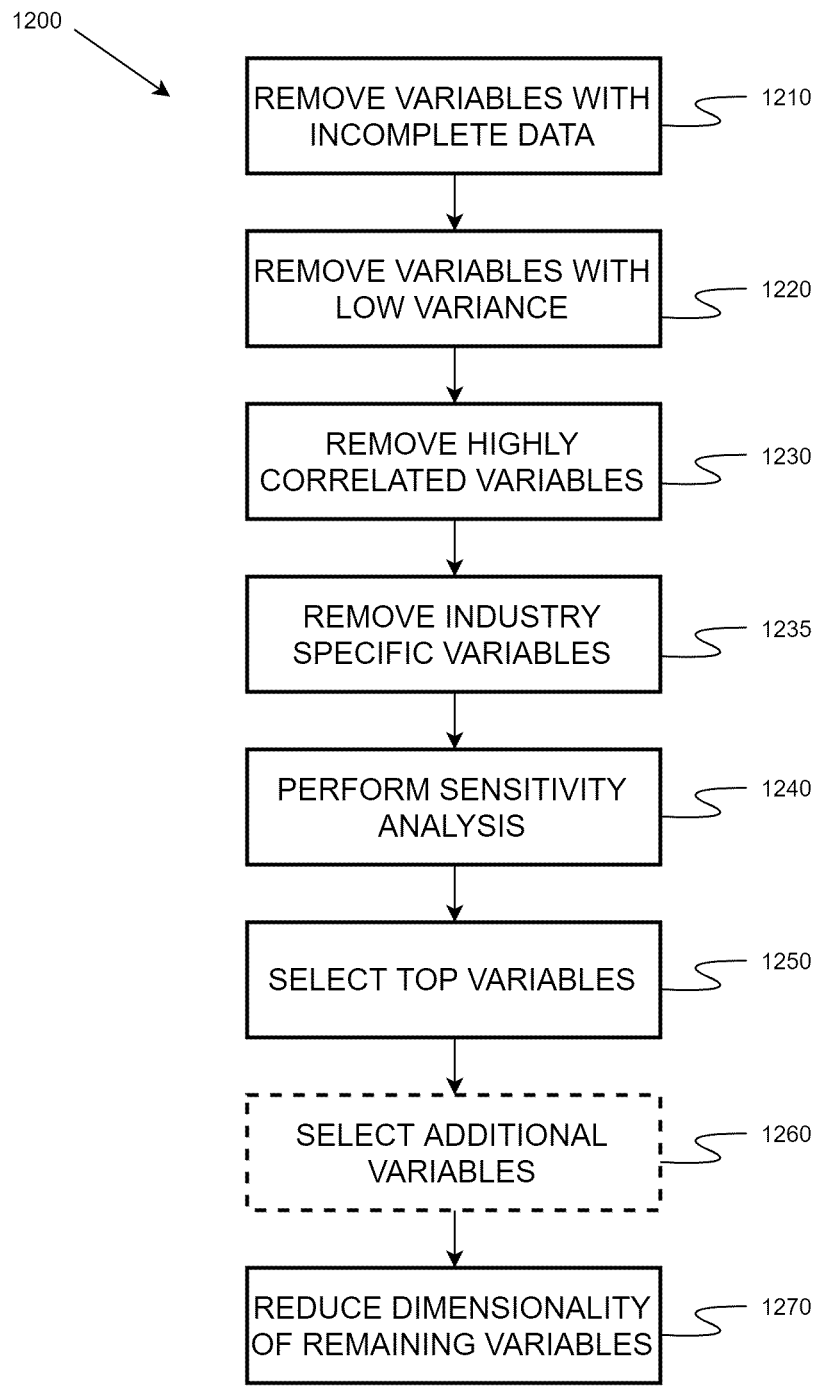
FIG. 12 illustrates an example method for feature engineering.

A method 1200 is illustrated in FIG. 12 to reduce the number of variables to a more manageable amount that can be used in predicting conversion aspects. In embodiments where the data is segmented, the described feature engineering process is performed separately for the data in each segment.

In step 1210, variables that provide an invalid, incorrect, or noisy signal with respect to the target may be removed. FIG. 13 illustrates examples of such variables. As shown, such variables may have large gaps in the data. This step may be performed by variable remove engine 420. In some embodiments, this step may be performed by manual inspection of the data, e.g., by using a data visualization package.

In step 1220, variables with low variance may be removed. Variables with unique values (i.e., all of the data is a single value) may be removed. In addition, numerical variables with relative difference between a top and a bottom percentile lower than a threshold may be removed. For example, if the difference between about the 0.25% and about the 99.75% percentile values is less than about 0.02, the variable may be removed. This step may be performed by variable remove engine 420.

Figure 14:
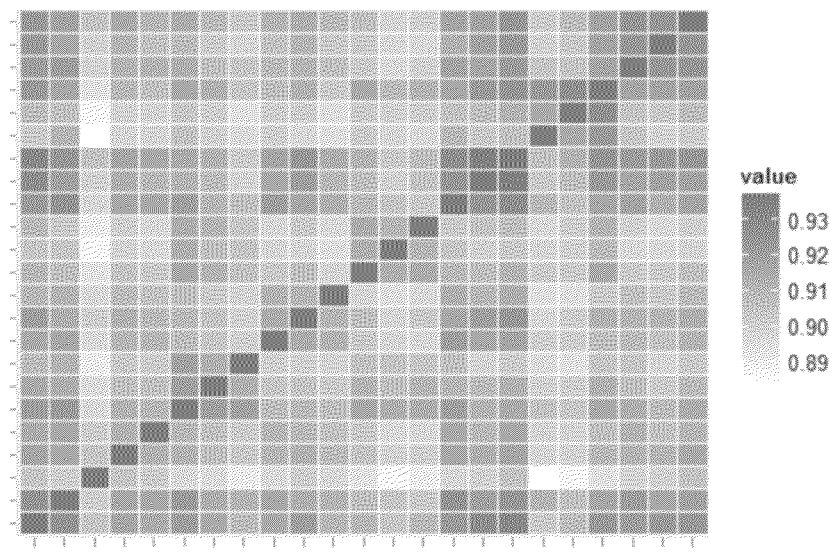
FIG. 14 illustrates a correlation heatmap.

In step 1230, variables that are highly correlated with other variables may be removed. In an example embodiment, variables with a correlation magnitude greater than about 0.95 compared to another variable may be removed. An example correlation heatmap, with the correlation magnitude indicated by the intensity of the pixels, is illustrated in FIG. 14. This step may be performed by variable remove engine 420.

In embodiments directed to particular types of data, as may be present in a particular industry, additional variables may be removed in step 1235.

In step 1240, a sensitivity analysis is performed on the remaining variables to determine the relative feature importance of the remaining variables on the target. In an embodiment, one or more preliminary models using the remaining variables are created to determine the relative feature importance of the remaining variables. The preliminary models may be any models for which feature importance can be evaluated, e.g., tree-based models, random forest models, gradient boosted models, etc.

In one embodiment the preliminary model or models may use all of the variables as inputs. In an alternative embodiment, variables to be used as inputs may be selected from the remaining variables. After the preliminary model or models are created, the relative important of the input variables can be determined.

Alternatively or additionally, one or more additional methods for determining the most important features with respect to their influence on the target may be used. For example, the Shapley values for each feature may be calculated and used to rank the features. This step may be performed by variable evaluation engine 430.

In step 1250, the top n variables, where n can range from about 100 to about 200 depending on the type of model, are selected. Alternatively, variables with a cumulative importance of a defined threshold, e.g., between about 0.6 and about 0.95, may be selected.

As explained in more detail below, n or the cumulative importance threshold may be considered a hyperparameter of the model that can be tuned. This step may be performed by variable evaluation engine 430.

Optionally, in step 1260, an additional number (m) of variables may be selected from the remaining input variables, i.e., the input variables outside of the most important variables selected in step 1250. The number of variables selected may be a tunable hyperparameter. In one embodiment, the m additional variables are randomly selected. In an alternative embodiment, the variables selected may be a tunable hyperparameter.

In embodiments where the input data is divided between a training data set and a testing data set, the evaluation of the input variables performed in steps 1240 through 1260 is performed only on the training set so the variables input to the model remain consistent across the training and testing set.

In step 1270, one or more statistical methods for variable reduction may be applied to the non-selected variables, i.e., the variables other than the top n variables selected in step 1250. For example, techniques such as random forest, dimensionality reduction, principle component analysis, etc., may be applied to reduce the number of variables. In one embodiment, an autoencoder may be used to extract the features. In one embodiment, between about 10 and about 20 features may be extracted from the non-selected variables for use in the model. The number of features may be a tunable hyperparameter. The trained autoencoder is saved so it can be used on current data.

The selected top n variables, the optionally selected m variables, and the new variables created by dimensionality reduction on the non-selected variables, are then combined into a feature set that is used to train the models. This step may be performed by dimension reduction engine 440.

Figure 15:
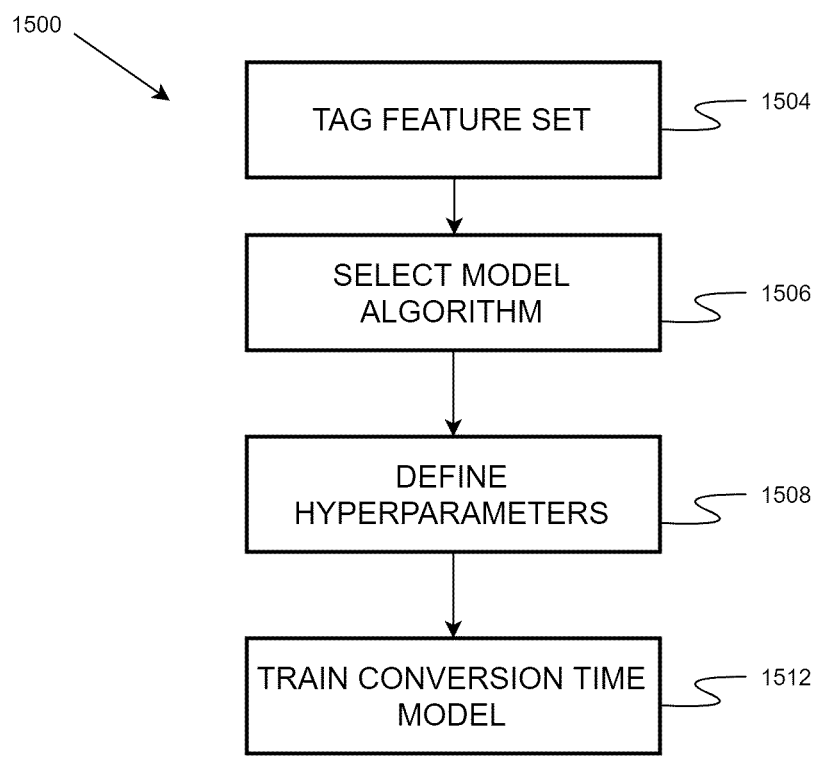
FIG. 15 illustrates an example method for generating a conversion time model.

A method 1500 for creating a conversion time model 1064 is illustrated in FIG. 15. In embodiments where data is segmented (including look-a-like segments created by look-a-like model 1072), separate conversion time models may be created for each segment. In step 1504, the feature set created in step 1120 is tagged to prepare for its use in training the model. The tagged training data may be divided into one or more sets for training, validation, testing, etc. The inputs of the training data are the features identified in step 1120 for each converted prospect. The target of the training data is the conversion time for each converted prospect.

In step 1506, the model algorithm is selected. In general, the model will be a regression model, and may be trained using a supervised machine learning approach. In an embodiment, the regression model may comprise a multi-layer perceptron (neural network), a tree-based gradient boosting model, an LSTM recurrent neural network, a convolutional neural network (CNN), combinations of the foregoing, etc.

In step 1508, the hyperparameters of the development model are defined. For a neural network model, these may include one or more of: the number of layers and neurons, number of units in each layer, the number of epochs (e.g., complete passes through the training set), optimization method(s) (e.g., stochastic gradient descent (SGD), Adam, etc.), error functions, activation function (e.g., sigmoid, RELU, Tanh, etc.), batch size, learning rate, dropout rate, etc.

For a gradient-boosted decision tree, the hyperparameters may include one or more of: tree maximum depth, number of leaves, boosting method, number of iterations, tree learners, feature fraction, number of features, learning rate, maximum number of bins, etc.

In step 1512, the conversion time model is trained using the training set(s) prepared in step 1504, as discussed above with respect to FIG. 9.

After the conversion time model is created, current data for a prospect, including quote data, etc., that has interacted with the system may be input into the model to generate a conversion time prediction for the prospect.

As discussed, models may also be trained or otherwise generated that identify other predictions for prospects that have interacted with the system in some way, e.g., by making an inquiry, requesting one or more quotes, interacting with a sales agent via telephone call or text chat, etc.

For example, a model may be generated to predict the number of interactions between the system and the prospect before conversion, e.g., conversion iterations model 1068. In a preferred embodiment, the conversion iterations model is a regression model, with the output of the model being the predicted number of iterations. In preparing the training data for a conversion iterations model 1068, the target of the input data is the number of iterations before conversion. The input data will comprise similar input data as the conversion time model.

Also, a model may be generated to predict the cost of conversion. In a preferred embodiment, the conversion cost model is a regression model, with the output of the model being the predicted cost of conversion. In preparing the training data for a conversion cost model, the target of the input data is the cost of the conversion of the converted prospect. The input data will comprise similar input data as the conversion time model.

As another example, a model may be generated to predict if a quote will result in a conversion, e.g., sales model 1060. In a preferred embodiment, the sales model is a classification model, with the output of the model being a likelihood of conversion for the prospect the quote was generated for. In preparing the training data for a sales model, the target of the input data whether or not the prospect converted. The input data will comprise all prospects for which a conversion outcome is known.

In one embodiment, a look-a-like prospect model 1072 may be created to identify segments of prospects that are more likely to convert than a base conversion ratio of the set of all prospects. For example, the look-a-like prospect model may identify that married prospects living in Texas (or another state), in the 40-50 age group, have an income> $60000, with 3 or more vehicles, have a conversion ratio of 55%, compared to the base conversion ratio of 24% of all prospect within the state of Texas.

Figure 16:
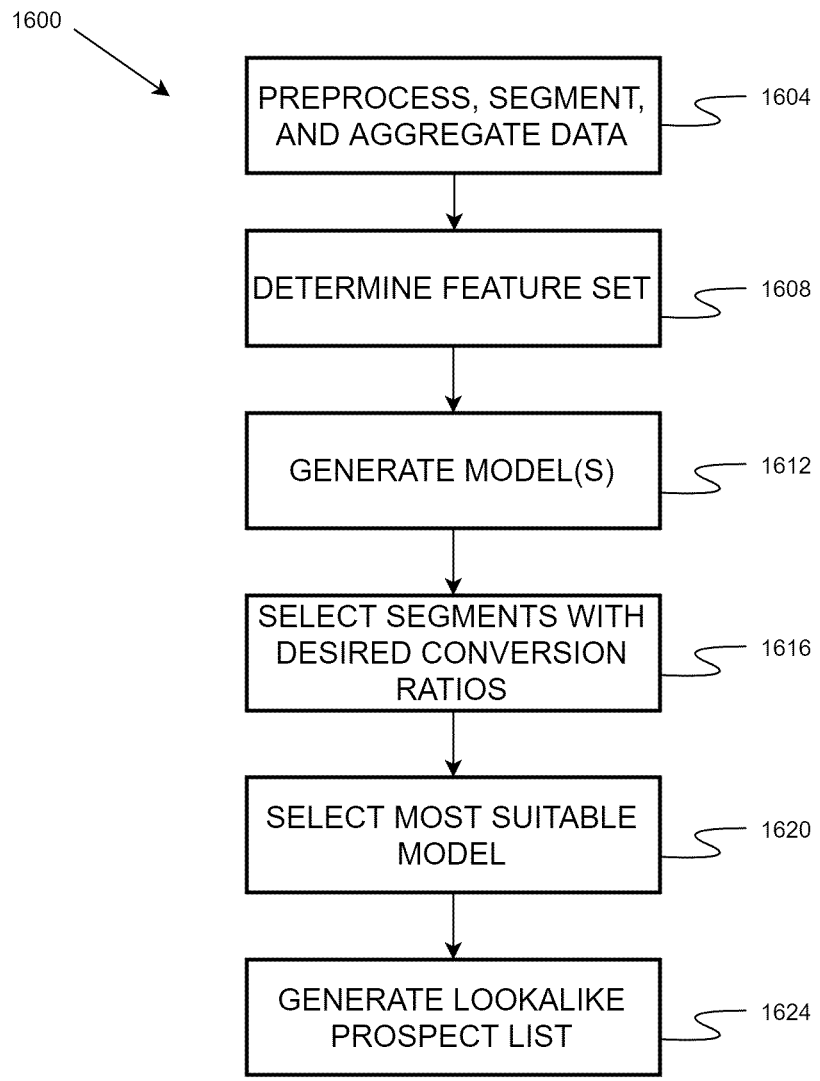
FIG. 16 illustrates an example method for generating a look-a-like prospect model.

A method 1600 for creating a look-a-like prospect model 1072 is illustrated in FIG. 16. In step 1604, the historical data, including input variables and the target, is preprocessed, cleaned, and aggregated. The historical data comprises all prospect data for prospects that were successfully converted and those that were not converted but had received a quote or had otherwise previously interaction with the system. The input variables comprise any and/or all of the prospect data variables described herein.

The target data comprises whether each prospect successfully converted. In embodiments targeting new customers (as opposed to marketing new products to existing customers), only prospects that were new customers at the time of conversion are considered to be a successful conversion.

The cleaning of the data may comprise standardizing data types and values, removing duplicated variables, removing variables with a unique value, removing variables with a high number of unique values (e.g., address, customer id), and removing obviously non-predictive variables (e.g., user id, etc.). Ordinal features may be converted to categorical features where the value of the ordinal feature actually corresponds to a category and does not have a true numerical meaning. In an embodiment, this step is performed by data clean engine 310.

Variables with incomplete data may also be removed in this step. For example, a variable with data for only 50% of prospects may be removed. The threshold percentage value may change based on the application.

The data is aggregated to the prospect level, and the data related to each prospect's location (e.g., weather data, etc.) is joined with the specific data relating to the prospect.

In step 1608, feature selection is performed on the input variables to identify those variables that have the highest correlation with the target. In one embodiment, a correlation shape analysis is performed on all of the input variables, and the variables with the highest significance with respect to the conversion ratio are selected. In one embodiment, between about 80 and about 120 variables may be selected.

The correlation shape analysis is performed using one or more correlation algorithms, e.g., Pearson chi-square, phi_k (as described at https://readthedocs.org/projects/phik/downloads/pdf/latest/), etc. The type of variable may determine which correlation algorithm is used. For example, Pearson chi-square can only be used on categorical variables, whereas phi_k may be used on any type of variable (categorical, ordinal, and interval). Alternatively, p-values can be calculated using the Pearson chi-square and/or an F test.

The result of running the correlation algorithms is list of the variables sorted in the order of how correlated each is with the target. After the variables of highest significance are determined, highly correlated variables may be removed (e.g., by use of a heat map or other correlation tools), and the remaining variables used as the feature set in training the model(s).

In step 1612, one or more machine learning models are trained using the feature set generated in step 1608. The models are based on association rule mining algorithms, classification algorithms, and/or decision tree-based algorithms. Examples of association rule mining algorithms include the Frequent-Pattern-Growth algorithm and the Apriori algorithm. Examples of classification and decision tree algorithms include CART, C4.5, CHAID, and QUEST.

Multiple models may be trained based on each algorithm, with different hyperparameters. For a decision tree algorithm (e.g., CHAID), the hyperparameters may include one or more of: tree maximum depth, number of leaves, alpha merge value, minimum parent node size, minimum child node size, etc. After the models are generated, they may be validated on holdout data from the input dataset.

In step 1616, segments with a conversion ratio in the desired range (e.g., above about 30% to about 50% for a high conversion ratio, between about 0% and about 10% for a low conversion ratio, etc.) are determined from the models trained in step 1612.

With respect to a decision tree algorithm, the leaves of the decision tree indicate each segment created by the algorithm. The decisions made by the tree at each node on the path to the leaf indicate the attributes of the segment. Segments with less than a threshold number of quotes may be disregarded.

With respect to association rule mining, all associations found by the algorithm are evaluated, and those with a conversion ratio within the desired range or higher than the desired threshold are selected as segments.

In step 1620, the most suitable model is selected from the models trained in step 1612. Suitability of a model is determined by the percentage of prospects included in all segments selected in step 1616, the number of features from the input feature set that were used to generate the segments, and the accuracy of the model on the holdout datasets. A higher total percentage of prospects captured by the selected segments is preferred. The number of features must be statistically significant (e.g., a segment based on one feature is not likely to be statistically significant), but a lower number of features generates more stable segments. A preferred number of features may range from between about 5 to about 20.

In step 1624, lists of look-a-like prospects are generated, based on the segments generated by the preferred model selected in step 1620. Marketing efforts can then be focused on the look-a-like prospect lists.

Sales models 1060, conversion cost models, conversion time models 1064, and conversion iterations models 1068 may be created specific to any segments generated by the look-a-like prospects model 1072.

Any of the above models related to conversion may be retrained periodically, e.g., daily, weekly, monthly, etc., as new data becomes available. For example, a likelihood of conversion model may be retrained each month with data regarding recently converted customers, by itself or in combination with older data, to improve the model's accuracy. The interval between retrainings may depend on how quickly new data becomes available.

In any of the embodiments described herein, the hyperparameters may be automatically tuned to generate the model, e.g., by an autotuner. For example, a pipeline may be used that automatically generates a model with a set of hyperparameters, trains the model, and evaluates the model. Other techniques for auto-tuning hyperparameters include random search, grid search, and Bayesian optimization. The models may be evaluated using mean square error (MSE), mean absolute error (MAE), accuracy, precision, recall, etc.

Figure 17:
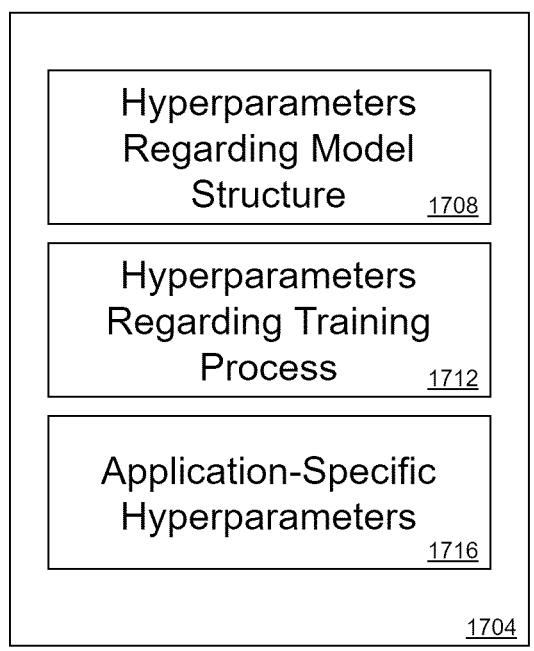
FIG. 17 illustrates example hyperparameters of a model that may be automatically tuned.

Hyperparameters 1704 that may be tuned include those shown in FIG. 17, e.g., hyperparameters related to the model structure 1708 (e.g., for a MLP, number of layers, nodes per layer, etc.), hyperparameters related to the training process 1712 (e.g., for a MLP, number of epochs, learning rate, etc.), and additional application-specific hyperparameters 1716. Application-specific hyperparameters may include hyperparameters related to which variables of the full set of input variables are chosen as input features used to train the model. For example, and as discussed elsewhere herein, a certain number of input variables that are the most important with regard to predicting the target are selected to be input features (see step 1250 of FIG. 12). This number may be a tunable hyperparameter. Similarly, the number of randomly-selected additional variables (m) in step 1260 may be a tunable application-specific hyperparameter. The precise variables selected in step 1260 may be a tunable application-specific hyperparameter. The number of features extracted from the non-selected variables is step 1270 may be a tunable application-specific hyperparameter.

Figure 18:
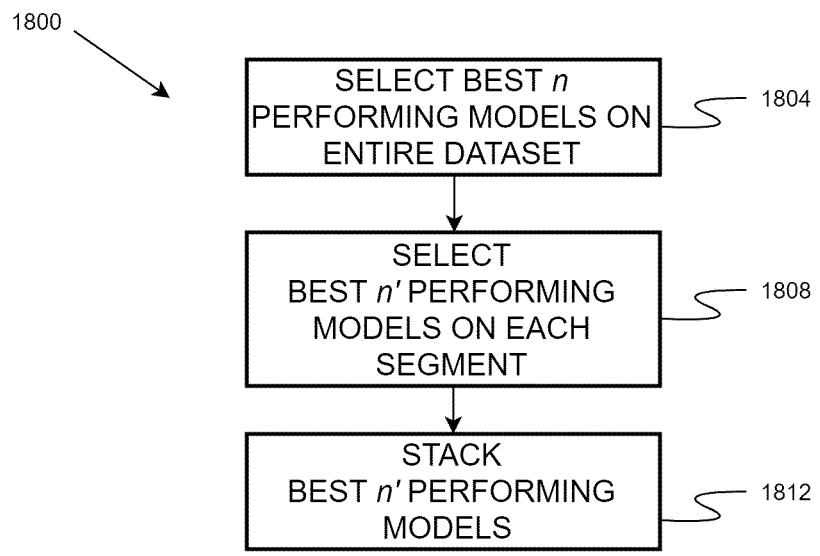
FIG. 18 illustrates an example method for creating an ensemble of models.

In any of the embodiments described herein, a preferred model may be created by model stacking, as illustrated in FIG. 18. In general, model stacking creates a single model that is composed of an ensemble of other models. Sometimes, an ensemble model can generate better predictions than any single individual model.

In step 1804, the best n performing models on the whole test dataset are selected. If an autotuner is used, the best performing models generated by the autotuner are selected. Otherwise, the best performing models with manually selected hyperparameters are selected. The best performing models may be selected based on criteria including, e.g., RMSE (root mean square error), MSE (mean square error), MAE (mean absolute error), accuracy, precision, recall, etc., between test data and values predicted by the model for the test data. In one embodiment, values for n can range from about 12 to about 20.

In step 1808, among the n models selected in step 1804, the best performing models for each state, group of states, or other geographical segment are selected. The best performing models may be selected based on criteria, e.g., possible overfitting of the models, the error (e.g., RMSE, MSE, MAE, accuracy, precision, recall, etc.) between test data and values predicted by the model when used on only the datasets pertaining to the respective state or groups of states. The best n′ models for each state or groups of states are selected. Values for n′ can range from about 6 to about 12 for optimal results.

In step 1812, for each state, the models selected in step 1808 are stacked to create the ensemble model. In one embodiment, each model is given equal weight in the ensemble model.

In an alternative embodiment, the ensemble model may comprise a regression model. The predictions of the selected individual models are used as the inputs (features) of the ensemble regression model. The parameters of the ensemble model may be separately tuned.

Figure 19:
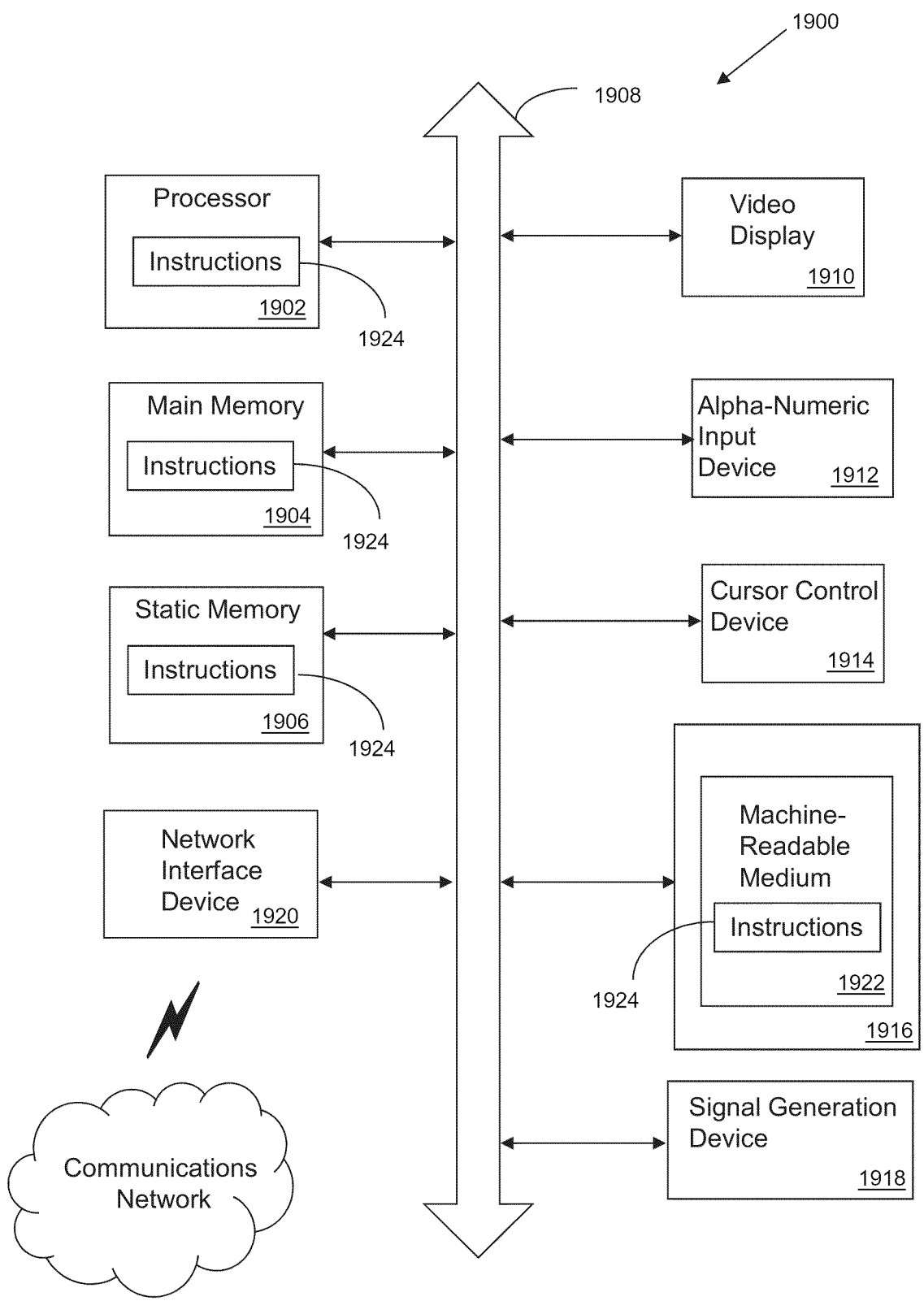
FIG. 19 is a schematic diagram of an example computing system for any of the systems described herein.

FIG. 19 is a schematic diagram of an example computing system for any of the systems described herein. At least a portion of the methodologies and techniques described with respect to the exemplary embodiments of the systems described herein may incorporate a machine, such as, but not limited to, computer system 1900, or other computing device within which a set of instructions, when executed, may cause the machine to perform any one or more of the methodologies or functions discussed herein. The machine may be configured to facilitate various operations conducted by the systems.

In some examples, the machine may operate as a standalone device. In some examples, the machine may be connected (e.g., using a communications network) to and assist with operations performed by other machines and systems. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1900 may include a processor 1902 (e.g., a central processing unit (CPU), a graphics processing unit (GPU, or both), a main memory 1904 and a static memory 1906, which communicate with each other via a bus 1908. The computer system 1900 may further include a video display unit 1910, which may be, but is not limited to, a liquid crystal display (LCD), a flat panel, a solid state display, or a cathode ray tube (CRT). The computer system 1900 may include an input device 1912, such as, but not limited to, a keyboard, a cursor control device 1914, such as, but not limited to, a mouse, a disk drive unit 1916, a signal generation device 1918, such as, but not limited to, a speaker or remote control, and a network interface device 1920.

The disk drive unit 1916 may include a machine-readable medium 1922 on which is stored one or more sets of instructions 1924, such as, but not limited to, software embodying any one or more of the methodologies or functions described herein, including those methods illustrated above. The instructions 1924 may also reside, completely or at least partially, within the main memory 1904, the static memory 1906, or within the processor 1902, or a combination thereof, during execution thereof by the computer system 1900. The main memory 1904 and the processor 1902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various examples of the present disclosure, the methods described herein are intended for operation as software programs running on a computer processor. Furthermore, software implementations can include, but not limited to, distributed processing or component/object distributed processing, parallel processing, or virtual machine processing, which can also be constructed to implement the methods described herein.

The present disclosure contemplates a machine-readable medium 1922 containing instructions 1924 so that a device connected to a communications network can send or receive voice, video or data, and communicate over the communications network using the instructions. The instructions 1924 may further be transmitted or received over the communications network via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se.

Accordingly, the disclosure is considered to include any one or more of a machine- readable medium or a distribution medium, as listed herein and including art-recognized equivalents and successor media, in which the software implementations herein are stored.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed steps, components, elements, features, aspects, characteristics, limitations, and the like, of the various non-limiting and non-exhaustive embodiments or examples described in this specification.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method for creating a set of look-a-like prospects, the method comprising:
    receiving historical data regarding prospects, wherein the historical data comprises one or more input variables and a target, wherein the target comprises a conversion status of each prospect;
    selecting features from the historical data to create a feature set, wherein the feature selection comprises:
        performing correlation shape analysis on each input variable with respect to the target to generate a set of highly correlated input variables;
    training at least one machine learning model based on the feature set;
    identifying segments in a predefined range of conversion percentage based on the trained at least one machine learning model;
    determining a most suitable model from the at least one machine learning model; and
    generating a set of look-a-like prospects based on the determined model.

2. The method of claim 1, wherein the prospects comprise quote-generating prospects.

3. The method of claim 1, wherein the correlation shape analysis comprises a Pearson chi-square or phi_k algorithm.

4. The method of claim 1, wherein the determined machine learning model comprises a decision tree algorithm.

5. The method of claim 1, wherein the determined machine learning model comprises an association rule mining algorithm.

6. The method of claim 1, wherein the most suitable machine learning model is determined based on one or more of the following: the number of segments identified, the percentage of the historical conversion prospects included in the identified segments, and the number of features from the feature set that were used to generate the identified segments.

7. The method of claim 1, wherein the prospect data comprises geo-demographic data or geographical risk assessment data.

8. A method for creating a conversion prediction model for predicting an aspect of conversion of a prospect, the method comprising:
    receiving historical data regarding prospects, wherein the historical data comprises one or more input variables and a target;
    feature engineering the historical data to create a feature set, wherein the feature engineering comprises:
        determine the relative importance of the input variables with respect to the target;
        selecting the variables of most importance and adding them to the feature set; and
        performing dimension reduction on the non-selected variables to create extracted features and adding the extracted features to the feature set; and
    creating the conversion prediction model based on the feature set.

9. The method of claim 8, wherein the conversion prediction model comprises a tree-based algorithm.

10. The method of claim 8, wherein the conversion prediction model comprises a neural network algorithm.

11. The method of claim 8, wherein the step of determining the importance of the input variables comprises generating at least one preliminary model and identifying the variables with the most influence on the target.

12. The method of claim 11, wherein the at least one preliminary model is a gradient boosted decision tree.

13. The method of claim 8, wherein the step of determining the importance of the input variables comprises Shapley values for each of the input variables.

14. The method of claim 8, wherein the dimension reduction is performed using an autoencoder.

15. The method of claim 8, wherein the conversion prediction model comprises a conversion iterations model, and wherein the historical data further comprises quote or inquiry data.

16. The method of claim 8, wherein the conversion prediction model comprises a conversion cost model, and wherein the historical data further comprises quote or inquiry data.

17. The method of claim 8, wherein the conversion prediction model comprises a conversion time model, and wherein the historical data further comprises quote or inquiry data.

18. A method for creating a conversion prediction model for predicting an aspect of conversion for a set of look-a-like prospects, the method comprising:
    receiving historical data regarding prospects, wherein the historical data comprises one or more input variables and a first target, wherein the first target comprises a conversion status of each prospect;
    selecting features from the historical data to create a first feature set, wherein the feature selection comprises:
        performing correlation shape analysis on each input variable with respect to the target to generate a set of highly correlated input variables;
    training at least one machine learning model based on the first feature set;
    identifying segments in a range of conversion percentage based on the trained at least one machine learning model;
    determining a most suitable model from the at least one machine learning model;
    generating a look-a-like segment based on the determined model;
    feature engineering the historical data for the look-a-like segment to create a second feature set, wherein the feature engineering comprises:
        determining the relative importance of the input variables in the historical data for the look-a-like segment with respect a second target;

selecting the variables of most importance and adding them to the second feature set; and performing dimension reduction on the non-selected variables to create extracted features and adding the extracted features to the second feature set; and creating the conversion prediction model based on the second feature set.

19. The method of claim 18, wherein the conversion prediction model comprises a conversion cost model, and wherein the historical data further comprises quote or inquiry data.

20. The method of claim 18, wherein the conversion prediction model comprises a conversion time model, and wherein the historical data further comprises quote or inquiry data.

* * * * *